(12) United States Patent
Altunbasak et al.

(10) Patent No.: US 6,393,054 B1
(45) Date of Patent: May 21, 2002

(54) SYSTEM AND METHOD FOR AUTOMATICALLY DETECTING SHOT BOUNDARY AND KEY FRAME FROM A COMPRESSED VIDEO DATA

(75) Inventors: Yucel Altunbasak; HongJiang Zhang, both of Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/062,868

(22) Filed: Apr. 20, 1998

(51) Int. Cl.[7] .................................................. H04B 1/66
(52) U.S. Cl. ...................... 375/240; 375/240; 382/173; 382/236; 382/305; 382/225; 345/440; 345/328; 345/348; 345/349; 345/356
(58) Field of Search .................................. 395/140, 155; 345/328, 348, 349, 356, 440; 348/700, 722, 416, 701, 699; 382/173, 236, 305, 225; 375/240

(56) References Cited

U.S. PATENT DOCUMENTS

| | | | |
|---|---|---|---|
| 5,521,841 A | 5/1996 | Arman et al. ................ | 364/514 |
| 5,574,845 A | 11/1996 | Benson et al. .............. | 395/118 |
| 5,606,655 A | 2/1997 | Arman et al. ................ | 395/140 |
| 5,635,982 A | 6/1997 | Zhang et al. ................ | 348/231 |
| 5,708,767 A * | 1/1998 | Yeo et al. .................... | 395/140 |
| 5,956,026 A * | 9/1999 | Ratakonda .................. | 345/328 |
| 5,990,980 A * | 11/1999 | Golin .......................... | 348/700 |
| 6,195,458 B1 * | 2/2001 | Warnick et al. ............. | 382/173 |

OTHER PUBLICATIONS

Zhang et al., "Video Parsing and Browsing Using Compressed Data", 1995, pp. 89–111, Multimedia Tools and Applications.

Sethi et al. "A Statistical Approach to Scene Change Detection", 1995, vol. 2420, pp. 329–338, SPIE.

\* cited by examiner

Primary Examiner—Chris Kelley
Assistant Examiner—Shawn S. An

(57) ABSTRACT

A system for detecting shot boundary in a compressed video data without decompression includes a difference detector that detects content difference between frames. When the difference detector determines that a first content difference between a current frame of the current group of frames and a previous frame of a first previous group of frames is greater than a first threshold, a sharp shot boundary detector detects a sharp shot boundary within the current group of frames. When the difference detector determines that the first content difference is not greater than the first threshold but a second content difference between the current frame and a previous frame of a second previous group of frames is greater than a second threshold, a gradual shot boundary detector detects a gradual shot boundary within the current group of frames. The gradual shot boundary detector includes a pan frame detector that detects pan boundaries, a zoom detector that detects zoom boundaries, and key frame detector that detects key frames. A threshold selection unit is coupled to the difference detector to select the thresholds in accordance with the content difference detected such that the sharp shot boundary detector, the gradual shot boundary detector, and the key frame function efficiently and effectively.

16 Claims, 23 Drawing Sheets

| MACRO-BLOCK MODE | I-PICTURE | P-PICTURE | B-PICTURE |
|---|---|---|---|
| SKIPPED | – | + | + |
| INTRA $P_i$ | + | + | + |
| FORWARD-PREDICTED $P_f$ | – | + | + |
| BACKWARD-PREDICTED $P_b$ | – | – | + |
| BIDIRECTIONALLY-PREDICTED $P_{bi}$ | – | – | + |

After the step 271:

| BIN | 0 | 1 | 2 | 3 | 4 | 5 | 6 | 7 | 8 | 9 |
|-----|---|---|---|---|---|---|---|---|---|---|
| $H_k$ |   | 5 | 3 | 7 | 8 | 2 | 1 | 9 | 2 | 2 |
| $H_l$ |   | 3 | 7 | 2 | 9 | 8 | 4 | 5 | 9 | 2 |

After the step 272:

| BIN | 0 | 1 | 2 | 3 | 4 | 5 | 6 | 7 | 8 | 9 |
|-----|---|---|---|---|---|---|---|---|---|---|
| $H_k$ | 0 | 2 | 0 | 5 | 0 | 0 | 0 | 4 | 0 | 0 |
| $H_l$ | 1 | 0 | 4 | 0 | 1 | 6 | 3 | 0 | 7 | 0 |

After the step 275:

| BIN | 0 | 1 | 2 | 3 | 4 | 5 | 6 | 7 | 8 | 9 |
|-----|---|---|---|---|---|---|---|---|---|---|
| $H_k$ | 0 | 2 | 0 | 5 | 0 | 0 | 0 | 4 | 0 | 0 |
| $H_l$ | 0 | 0 | 4 | 0 | 1 | 6 | 3 | 0 | 3.4 | 0 |

| BIN | 1 | 2 | 3 | 4 | 5 | 6 | 7 | 8 | 9 | 10 | |
|---|---|---|---|---|---|---|---|---|---|---|---|
| $H_k$ | 0.00 | 2.00 | 0.00 | 0.95 | 0.00 | 0.00 | 0.00 | 0.08 | 0.00 | 0.00 | } 290 |
| $H_l$ | 1.00 | 0.00 | 4.00 | 0.00 | 1.00 | 1.63 | 3.00 | 0.00 | 3.40 | 0.00 | |
| $H_k$ | 0.00 | 0.20 | 0.00 | 0.10 | 0.00 | 0.00 | 0.00 | 0.08 | 0.00 | 0.00 | } 291 |
| $H_l$ | 1.00 | 0.00 | 1.35 | 0.00 | 1.00 | 1.63 | 3.00 | 0.00 | 3.40 | 0.00 | |
| $H_k$ | 0.00 | 0.20 | 0.00 | 0.10 | 0.00 | 0.00 | 0.00 | 0.01 | 0.00 | 0.00 | } 292 |
| $H_l$ | 1.00 | 0.00 | 1.35 | 0.00 | 1.00 | 1.63 | 3.00 | 0.00 | 3.33 | 0.00 | |
| $H_k$ | 0.00 | 0.20 | 0.00 | 0.10 | 0.00 | 0.00 | 0.00 | 0.00 | 0.00 | 0.00 | } 293 |
| $H_l$ | 1.00 | 0.00 | 1.35 | 0.00 | 1.00 | 1.63 | 3.00 | 0.00 | 3.32 | 0.00 | |
| $H_k$ | 0.00 | 0.20 | 0.00 | 0.10 | 0.00 | 0.00 | 0.00 | 0.00 | 0.00 | 0.00 | } 294 |
| $H_l$ | 1.00 | 0.00 | 1.35 | 0.00 | 1.00 | 1.63 | 3.00 | 0.00 | 3.32 | 0.00 | |
| $H_k$ | 0.00 | 0.20 | 0.00 | 0.10 | 0.00 | 0.00 | 0.00 | 0.00 | 0.00 | 0.00 | } 295 |
| $H_l$ | 1.00 | 0.00 | 1.35 | 0.00 | 1.00 | 1.63 | 3.00 | 0.00 | 3.32 | 0.00 | |
| $H_k$ | 0.00 | 0.20 | 0.00 | 0.02 | 0.00 | 0.00 | 0.00 | 0.00 | 0.00 | 0.00 | } 296 |
| $H_l$ | 1.00 | 0.00 | 1.35 | 0.00 | 1.00 | 1.55 | 3.00 | 0.00 | 3.32 | 0.00 | |
| $H_k$ | 0.00 | 0.20 | 0.00 | 0.00 | 0.00 | 0.00 | 0.00 | 0.00 | 0.00 | 0.00 | } 297 |
| $H_l$ | 1.00 | 0.00 | 1.35 | 0.00 | 1.00 | 1.53 | 3.00 | 0.00 | 3.32 | 0.00 | |
| $H_k$ | 0.00 | 0.20 | 0.00 | 0.00 | 0.00 | 0.00 | 0.00 | 0.00 | 0.00 | 0.00 | } 298 |
| $H_l$ | 1.00 | 0.00 | 1.35 | 0.00 | 1.00 | 1.53 | 3.00 | 0.00 | 3.32 | 0.00 | |
| $H_k$ | 0.00 | 0.02 | 0.00 | 0.00 | 0.00 | 0.00 | 0.00 | 0.00 | 0.00 | 0.00 | } 299 |
| $H_l$ | 1.00 | 0.00 | 1.16 | 0.00 | 1.00 | 1.53 | 3.00 | 0.00 | 3.32 | 0.00 | |
| $H_k$ | 0.00 | 0.00 | 0.00 | 0.00 | 0.00 | 0.00 | 0.00 | 0.00 | 0.00 | 0.00 | } 299a |
| $H_l$ | 1.00 | 0.00 | 1.15 | 0.00 | 1.00 | 1.53 | 3.00 | 0.00 | 3.32 | 0.00 | |

*Figure 19*

SYSTEM AND METHOD FOR AUTOMATICALLY DETECTING SHOT BOUNDARY AND KEY FRAME FROM A COMPRESSED VIDEO DATA

BACKGROUND OF THE INVENTION

1. Field of the Invention

The present invention pertains to video data processing. More particularly, this invention relates to a system and a method for automatically detecting sharp and gradual shot boundaries and key frames from a compressed video data without fully decompressing the video data.

2. Description of the Related Art

With the advances in digital storage, Internet, and multimedia computing technologies, storing, accessing, and manipulating digital video are now becoming possible. For example, a video program or a collection of video programs can be stored by an optical disc and be accessed by a computer system connected to an optical disc driver with the optical disc either locally or via a network. This allows creation of a video image database that can store a collection of video programs.

However, one of the challenging problems in image or video databases is the organization of video information. Segmenting a video program into a number of appropriate units (i.e., clips) and characterizing each clip for indexing has been suggested as one possible mechanism for organizing video information. This approach requires that the cut points in the video program be located. One way of locating the cut points is to determine the boundaries between consecutive camera shots. As is known, a shot in video parlance refers to a contiguous recording of one or more video frames depicting a continuous action in time and space. During a shot, the camera may remain fixed, or it may exhibit one of the characteristic motions—namely, panning, tilting, or tracking.

Determining the shot boundaries in a video has a number of practical applications. For example, the isolation of shots in video databases is of interest because the shot level organization of video documents is considered most appropriate for video browsing and content based retrieval. Shots also provide a convenient level for the study of the video program.

A number of prior methods have been proposed to automatically determine the shot boundaries in a video program. One such prior method is described in U.S. Pat. No. 5,635,982, issued on Jun. 3, 1997, by Hong J. Zhang, and entitled SYSTEM FOR AUTOMATIC VIDEO SEGMENTATION AND KEY FRAME EXTRACTION FOR VIDEO SEQUENCES HAVING BOTH SHARP AND GRADUAL TRANSITIONS. However, one disadvantage of this prior approach is that it is based on uncompressed video data. This means that the prior approach can only detect shot boundaries from uncompressed video data. Decompression is required if the video data is a compressed one. As more and more video programs are stored and transmitted in compressed digital format to reduce the data volume of the video programs for storage and transmission, the decompressed video data needs to be re-compressed after shot boundary detection. This is not cost effective because the decompression and compression are otherwise not needed. In addition, due to the need for decompression, the prior approach takes relatively longer time to complete the shot boundary detection.

Another prior approach to automatically detect shot boundaries in video data is described in U.S. Pat. No. 5,606,655, issued on Feb. 25, 1997, by Farshid Arman et al., and entitled METHOD FOR REPRESENTING CONTENTS OF A SINGLE VIDEO SHOT USING FRAMES, and U.S. Pat. No. 5,521,841, issued on May 28, 1996, by Farshid Arman et al., and entitled BROWSING CONTENTS OF A GIVEN VIDEO SEQUENCE. However, one disadvantage of this prior approach is that it typically cannot detect gradual transitions between shots. This means it cannot detect camera operations such as panning, zooming, or other special effects.

SUMMARY OF THE INVENTION

One feature of the present invention is to allow automatic detection and extraction of shot boundaries and key frames from a compressed video data without decompression.

Another feature of the present invention is to allow automatic detection and extraction of sharp and gradual shot boundaries, camera operations, and key frames from a compressed video data.

A still another feature of the present invention is to allow fast and robust automatic detection and extraction of shot boundaries and key frames from a compressed video data.

A further feature of the present invention is to provide an adaptive threshold selection scheme for the automatic detection and extraction of shot boundaries and key frames from the compressed data.

A system for detecting shot boundary in a compressed video data without decompressing the video data includes a difference detector that detects content difference between a current frame of a current group of frames and previous frames of previous groups of frames. When the difference detector determines that a first content difference between the current frame and a previous frame of a first previous group of frames is greater than a first threshold ($T_S$), a sharp shot boundary detector is used to detect a sharp shot boundary between the current frame and the previous frame of the first previous group. When the difference detector determines that (1) the first content difference is not greater than the first threshold and (2) a second content difference between the current frame and a previous frame of a second previous group of frames is greater than a second threshold ($T_G$), a gradual shot boundary detector is used to detect a gradual shot boundary between the current frame and the previous frame of the second previous group. The second previous group of frames are prior to the first previous group of frames.

The gradual shot boundary detector includes a pan frame detector that detects pan boundaries, a zoom detector that detects zoom boundaries, and key frame detector that detects key frames. In addition, the system also includes a threshold selection unit coupled to the difference detector to select the thresholds in accordance with the content difference detected such that the sharp shot boundary detector, the gradual shot boundary detector, and the key frame function efficiently and effectively.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 11 shows the table of the macro-block modes with respect to the types of the pictures.

FIGS. 18 and 19 show the calculated histograms for an example using the difference metric scheme of FIG. 17.

DETAILED DESCRIPTION OF THE INVENTION

Figure 1:
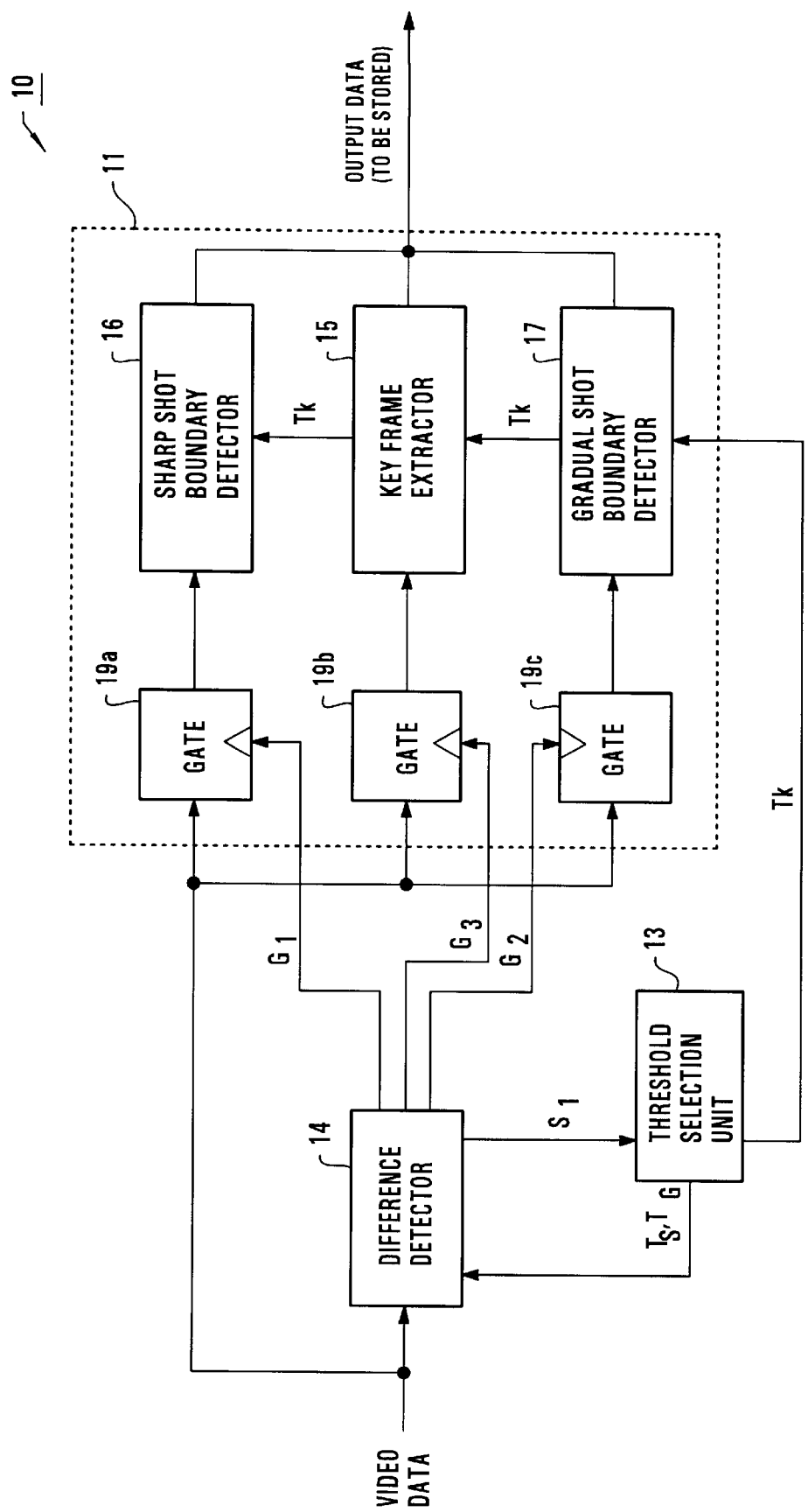
FIG. 1 shows the structure of a shot boundary and key frame detection system that implements one embodiment of the present invention, wherein the detection system includes a difference detector, a threshold selection unit, and a shot boundary detection and key frame extraction system.

FIG. 1 shows a shot boundary and key frame detection system 10 that implements one embodiment of the present invention. As will be described in more detail below, the shot boundary and key frame detection system 10 allows automatic detection and extraction of shot boundaries and key frames from a compressed video data using automatically generated and adjusted thresholds. The shot boundaries include sharp and gradual shot boundaries and camera operations. The key frames also include camera operations (e.g., panning and zooming). The detection and extraction are done without decompressing the compressed video data.

In accordance with one embodiment of the present invention, the shot boundary and key frame detection system 10 employs compression information (e.g., macro-block mode information) contained in the compressed video data to detect sharp and gradual shot boundaries and camera operations in the compressed video data, and to extract key frames from the compressed video data. The shot boundary and key frame detection system 10 detects content differences between a current frame of a current group of frames with previous frames of previous groups of frames to determine if the current group of frames contain a sharp or gradual shot boundary. The shot boundary and key frame detection system 10 uses normalized difference metric to measure the content differences in order to perform the detection and extraction functions. The normalization is in regard to the rate, height, and width of the frames. The shot boundary and key frame detection system 10 also selects reliable motion vector data from the compressed video data to detect camera operations (e.g., panning and zooming) and to extract the camera operation key frames.

In addition, the shot boundary and key frame detection system 10 employs an adaptive threshold selection scheme that automatically selects a number of thresholds (e.g., $T_S$, $T_G$, and $T_K$) used for shot boundary detection and key frame extraction. The adaptive threshold selection scheme also adjusts the thresholds in accordance with detected content difference between different frames of the video data. This ensures fast and robust automatic detection and extraction of shot boundaries and key frames. The adaptive threshold selection scheme also regulates the key frame density (i.e., low, medium, high, or memory fit) by adjusting the thresholds such that all selected key frames fit into the space of the key frame storage.

As will be described in more detail below and in accordance with one embodiment of the present invention, the shot boundary and key frame detection system 10 includes a threshold selection unit 13 that generates and adjusts the thresholds. In addition, the system 10 includes a difference detector 14 and a boundary detection and key frame extraction module 11. The difference detector 14 detects content difference (or frame difference) between a current frame of a current group of frames of the compressed video data and previous frames (e.g., I frames) of previous groups of frames using two of the thresholds (i.e., $T_S$ and $T_G$). This means that the difference detector 14 treats all frames within a group of frames (referred to as "GOP" below) as "similar". This means that the difference detector 14 only detects whether there is a change from one group of frames to another group of frames. This detection allows the module 11 to detect sharp or gradual shot boundaries, and to extract key frames. As described above, the key frames include pan key frames and zoom key frames. The modules 11, 13, and 14 of the shot boundary and key frame detection system 10 will be described in more detail below, also in conjunction with FIGS. 1 through 20.

Referring to FIG. 1, the shot boundary and key frame detection system 10 can be implemented by hardware, software, or firmware. The shot boundary and key frame detection system 10 can be implemented in a video browser system, a video storage system, or a multi-media computer system. The video browser system can be a DVD (Digital Video Disc) player or other computer-based digital video system. In one embodiment, the shot boundary and key frame detection system 10 is implemented in a computer system with multi-media and video processing capability. The computer system can be a personal computer, a notebook computer, a mini-computer, a workstation, or a mainframe computer.

As can be seen from FIG. 1, the video data received by the difference detector 14 is a compressed video data. In one embodiment, the compressed video data is compressed according to MPEG (Moving Picture Experts Group) standard. Alternatively, the video data can be compressed according other video compression standard. For example, the compressed video data can be a motion JPEG (Joint Photographic Experts Group) video data.

Figure 10:
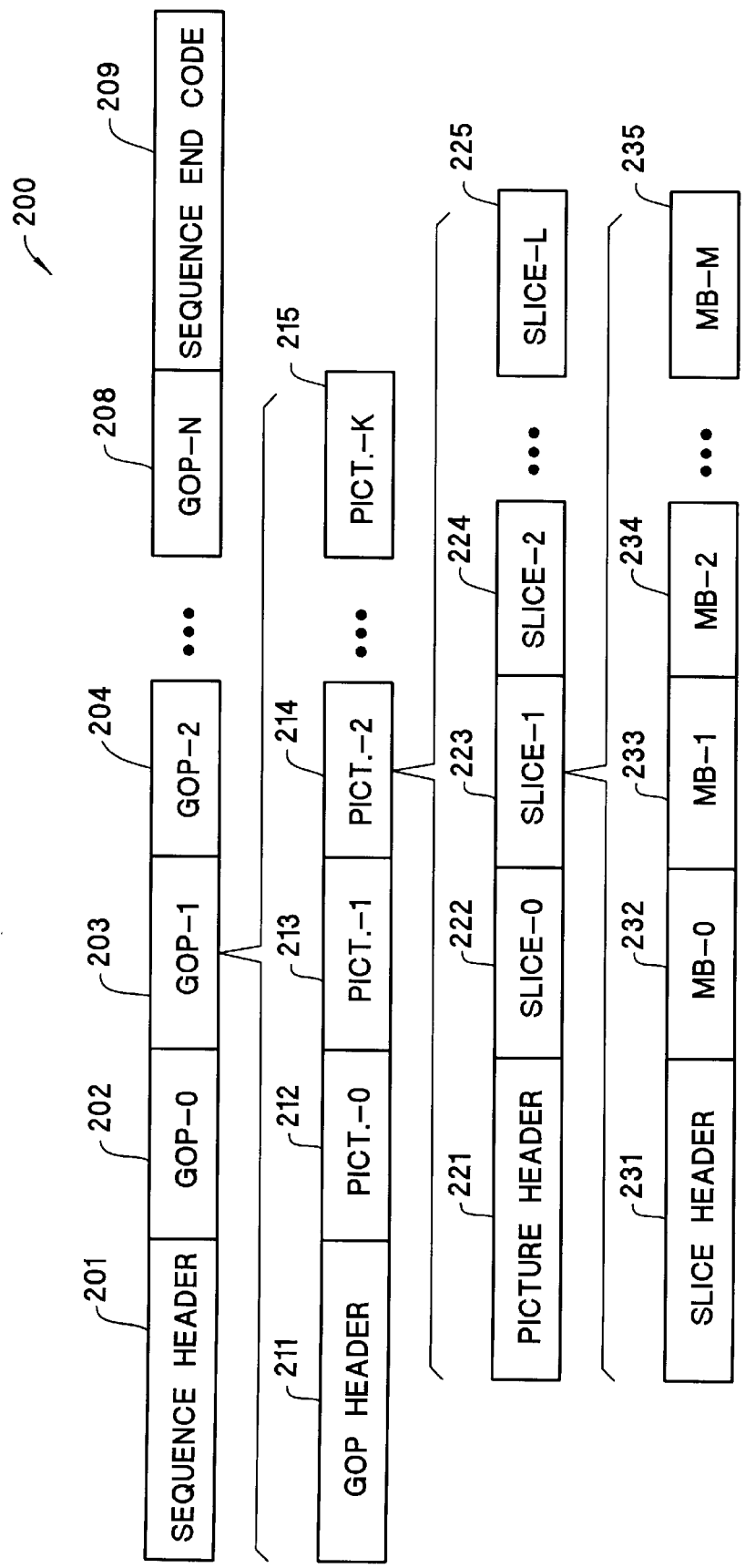
FIG. 10 shows the data structure of the MPEG compressed video data.

When the video data supplied to the shot boundary and key frame detection system 10 is compressed in accordance with the MPEG standard, the compressed video data structure is shown in FIGS. 10 and 11. As can be seen from FIG. 10, the compressed video data 200 consists of a sequence header 201 followed by a sequence of Group of Pictures (GOPs) (e.g., GOP-0, GOP-1, etc.) and a sequence end code 209. The sequence header 201 contains information about the video, such as picture resolution and frame rate. The sequence end code 209 indicates the end of the sequence. When video data is compressed in accordance with other compression standard, the compressed video data can be processed to have similar structure as MPEG by grouping a number of frames into a group.

Each GOP contains a GOP-header (e.g., GOP-header 211) followed by a sequence of pictures (e.g., pict.-0 through pict.-k). The number of pictures (i.e., frames) within each GOP may change from one GOP to another. There can be three types of pictures in a GOP. They are: I-pictures, P-pictures, and B-pictures. An I-picture is a picture or frame that can be decompressed without any reference to any other pictures. This means I pictures do not need motion compensation. A P-picture is a picture or frame that can only be decompressed with reference to previous I or P pictures or frames. This means that P pictures require motion compensation from one direction. A B-picture is a picture or frame that can only be decompressed with reference to previous or subsequent I and P pictures or frames. This means that a B-picture is a bi-directional referenced and requires motion compensation from both directions. The pictures contain three channels: Y, U, and V. Y channel is usually referred to as "Luma" (i.e., luminance), whereas the other two are referred to as "Chroma" (i.e., chrominance). The Chroma channels may be sub-sampled by two in each direction.

Each picture includes a picture header (e.g., the picture header 221) and a sequence of slices (e.g., slice-0, slice-i). Each slice is sixteen pixels wide. The length of each slice can be the width or length of the picture. Each slice includes a slice header (e.g., the slice header 231) and a sequence of pixel blocks. Each pixel block is referred to as a macroblock (MB) and is sixteen by sixteen pixels in size, in one embodiment.

A mode is associated with each macro-block. The mode information determines how the macro-block is coded. There are several modes, as shown in FIG. 11. As can be seen from FIG. 11, the macro-block modes include a skipped mode, a forward-predicted mode ($P_f$), a backward-predicted mode ($P_b$), a bi-directionally predicted mode ($P_{bi}$), and an intra mode ($P_i$). However, the picture type may restrict the allowable macro-block modes on a picture. For example, the forward-predicted mode ($P_f$) is not allowed at I type pictures. Only the intra mode ($P_i$) is allowed at the I-type pictures.

The MB mode information can be used by the shot boundary and key frame detection system 10 of FIG. 1 to precisely locate the sharp or gradual shot boundary within a GOP with respect to a previous frame within a previous GOP. When the shot boundary and key frame detection system 10 does not need to precisely locate the shot boundary, the MB mode information is not used. In this case, the shot boundary and key frame detection system 10 only regards the shot boundary to be at the first frame of the GOP detected to have a shot boundary. In one embodiment, the shot boundary and key frame detection system 10 precisely locates the location of a shot boundary. In another embodiment, the shot boundary and key frame detection system 10 does not precisely determine the location of a shot boundary.

Referring back to FIG. 1, the difference detector 14 of the system 10 receives the compressed video data from an external source (not shown in FIG. 1). As described above, the compressed video data includes a number of GOPs. Thus, the difference detector 14 detects the content difference between two GOPs, each having a number of frames or pictures. One of the GOPs is the currently received GOP (referred to as current GOP) and the other is a previously received GOP (referred to as previous GOP). Content difference means the difference of color histograms between two frames. The difference detector 14 determines the content difference of the two GOPs by determining the content difference between a current frame within the current GOP and a previous frame within the previous GOP.

In one embodiment, the current frame of the current GOP is a first I frame within the current GOP and the previous frame is a first I frame within the previous GOP. Alternatively, the current frame of the current GOP can be other frames within the current GOP and the previous frame of the previous GOP can be other frames within the previous GOP.

Depending on the content difference detected, the difference detector 14 then controls the boundary detection and key frame extraction module 11 to detect the actual location of the sharp shot boundary or the gradual shot boundary, or to extract the key frame from the current GOP. The operation of the difference detector 14 is described as follows. First, the difference detector 14 detects a first content difference $S_1$. The first content difference $S_1$ is the content difference between the current frame of the current GOP and the previous frame of a first previous GOP which is immediately adjacent to and preceding the current GOP. Alternatively, the first previous GOP is not immediately preceding the current GOP, but rather preceding the current GOP by more than one GOP.

The difference detector 14 then compares the first content difference $S_1$ with the threshold $T_S$ to determine if there is a sharp shot boundary between the current GOP and the first previous GOP. As described above, the threshold $T_S$ and other thresholds (i.e., $T_G$ and $T_K$) are supplied by the threshold selection unit 13 which is connected to the difference detector 14. The selection of these thresholds as well as the threshold selection unit 13 will be described in more detail below.

If the first content difference $S_1$ is greater than the threshold $T_S$, it indicates that there is a sharp shot boundary between the current GOP and the first previous GOP. In this case, the difference detector 14 causes the video data (i.e., the current GOP and the first previous GOP) to be applied to a sharp shot boundary detector 16 of the module 11 via a gate 19a to detect the exact location of the sharp shot boundary within the current GOP with respect to. the first previous GOP. The sharp shot boundary detector 16 also includes a key frame extractor 16b (shown in FIG. 4) that extracts the video frame at the location of the detected sharp shot boundary and labels that frame as a key frame or a sharp shot boundary key frame.

In addition, the difference detector 14 also sends the first content difference $S_1$ to the threshold selection unit 13 to adjust the values of the thresholds. This will be described in more detail below, in conjunction with the description of the threshold selection unit 13.

If, on the other hand, the first content difference $S_1$ is not greater than the threshold $T_S$, it indicates that there is no sharp shot boundary between the current GOP and the first previous GOP. In this case, the difference detector 14 then detects a second content difference $S_4$ in order to find out if there is a gradual shot boundary within the current GOP. The second content difference $S_4$ is the content difference between the current frame of the current GOP and the previous frame of a second previous GOP. The second previous GOP precedes the current GOP and the first previous GOP.

In one embodiment, the second previous GOP precedes the current GOP by four GOPs. Alternatively, the second previous GOP precedes the current GOP by N number of GOPS, wherein N can be three, four, five, six, etc.

The difference detector 14 then compares the second content difference $S_4$ with the threshold $T_G$ to determine if there is a gradual shot boundary between the current GOP and the second previous GOP. If the second content difference $S_4$ is greater than the threshold $T_G$, it indicates that there is a gradual shot boundary between the current GOP and the second previous GOP. In this case, the difference detector 14 causes the video data (i.e., the current GOP and the second previous GOP) to be applied to a gradual shot boundary detector 17 of the module 11 via a gate 19c to detect the exact location of the gradual shot boundary within the current GOP with respect to the second previous GOP. The gradual shot boundary detector 17 also detects locations of camera operation and extracts camera operation key frames. The gradual shot boundary detector 17 also includes a key frame extractor 17b (FIG. 7) that extracts the video frame at the location of the detected gradual shot boundary or camera operation and labels that frame as a gradual shot boundary key frame. The key frame extracted can also include a camera operation key frame, such as pan key frame or zoom key frame.

If, on the other hand, the second content difference $S_4$ is not greater than the threshold $T_G$, it indicates that there is no gradual shot boundary between the current GOP and the second previous GOP. In this case, the difference detector 14 then sends the video data (i.e., the current GOP) to a key frame extractor 15 of the module 11 via a gate 19b to extract a key frame between the current frame and a last selected key frame. The last selected key frame is the selected key frame from the last key frame extraction for the previous GOP that immediately precedes the current GOP. The last selected key frame is obtained from a key frame store (not shown) that stores all the selected key frames.

Alternatively, the shot boundary and key frame detection system 10 may only include the difference detector 14, the threshold selection unit 13, and the key frame extractor 15. In this case, the system 10 is only a key frame extraction system and does not detect any shot boundary. In this case, the threshold selection unit 13 only generates the threshold $T_K$. This threshold $T_K$ is applied to the difference detector 14 and the key frame extractor 15. If the difference detector 14 detects that the content difference $S_1$ is greater than the threshold $T_K$, the current GOP is sent to the key frame extractor 15 for key frame extraction. If not, the current GOP is not sent to the key frame extractor 15 for key frame extraction. As described above, the key frame extracted may be a sharp shot boundary key frame, a gradual shot boundary key frame, a camera operation (e.g., pan and zoom) key frame.

All of the thresholds $T_S$, $T_G$, and $T_K$ are generated by the threshold selection unit 13. The threshold selection unit 13 automatically selects and adjusts the thresholds in accordance with the first content difference $S_1$ such that the sharp shot boundary detector 16, the gradual shot boundary detector 17, and the key frame extractor 15 function efficiently and effectively. The threshold selection unit 13 adjusts the thresholds using all the first content differences (i.e., $\Sigma S_1$) detected by the difference detector 14 to eliminate the dependency of detection accuracy on video types. This in turn eliminates the need to manually customize optimal thresholds for each type of video sequences. The threshold selection unit 13 also adjusts the thresholds in accordance with the space constraint of a key frame storage (not shown) that stores all the extracted key frames. In doing so, the key frame density (i.e., low, medium, high, or memory fit) is adjusted or regulated such that all selected key frames fit into the space of the key frame storage.

Figure 2:
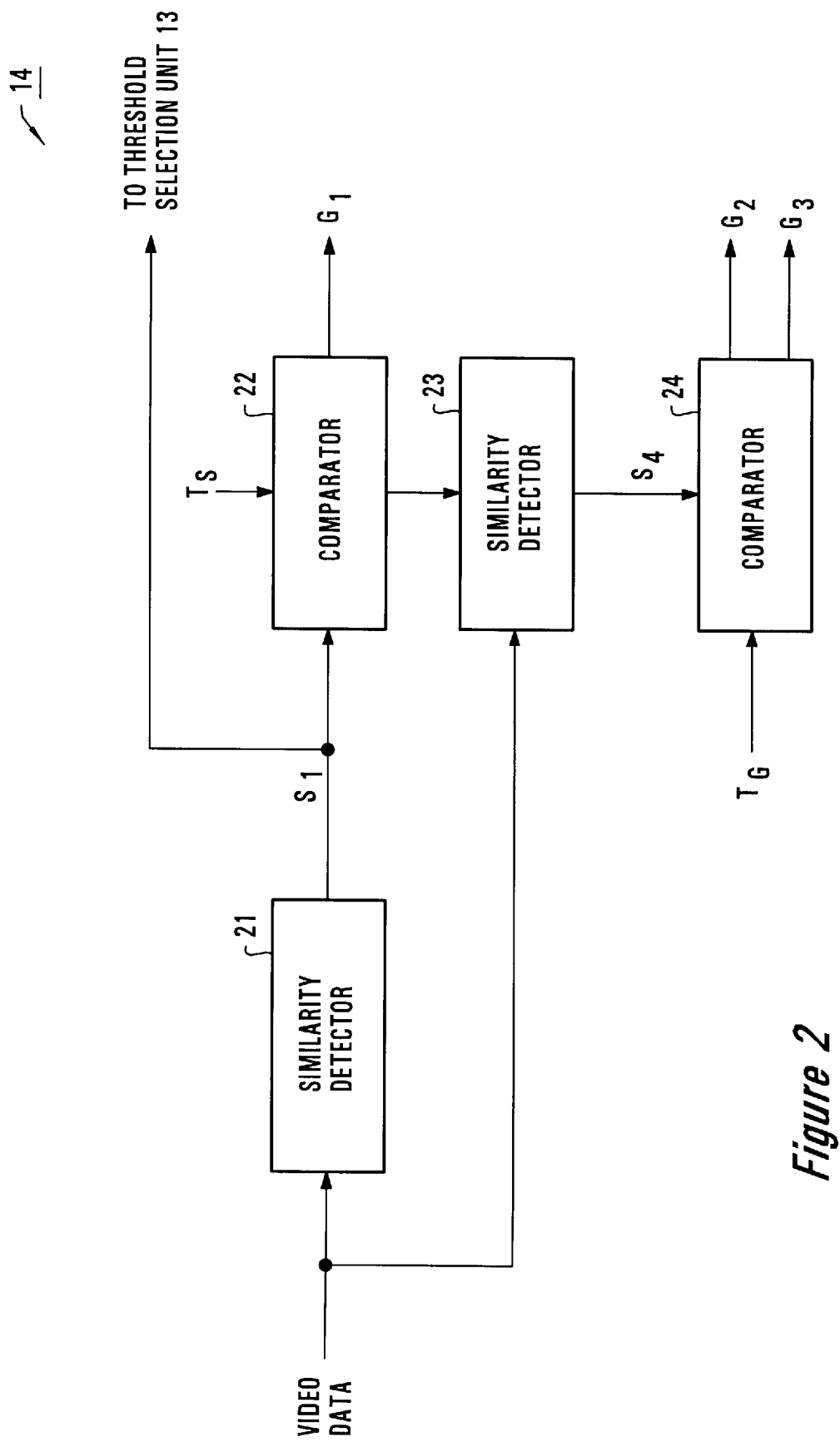
FIG. 2 shows the structure of the difference detector.

FIG. 2 shows the structure of the difference detector 14. As can be seen from FIG. 2, the difference detector 14 includes similarity detectors 21 and 23 and comparators 22 and 24. The similarity detector 21 is used to detect the first content difference $S_1$ and the similarity detector 23 is used to detect the second content difference $S_4$. The comparator 22 is used to compare the first content difference $S_1$ with the threshold $T_S$ and the comparator 24 is used to compare second content difference $S_4$ with the threshold $T_G$. The comparators 22 and 24 can be implemented using any known technology or scheme, which will not be described in more detail below.

The similarity detector 21 first compares the current frame of the current GOP with the previous frame of the first previous GOP to obtain a histogram difference $D_1$ in accordance with the following equation.

$$D_1 = \sum_{K=1}^{N} \{[H_i(k) - H_{i-1}(k)]^2 / [H_i(k) + H_{i-1}(k)]^2\}$$

wherein N indicates the number of total blocks within a frame, $H_i(k)$ is the DC histogram for the current frame, and $H_{i-1}(k)$ is the DC histogram of the previous frame of the first previous GOP. The DC histogram of a frame is the histograms of DC coefficients of all MB blocks within that frame, which can be calculated using known means.

Figure 16:
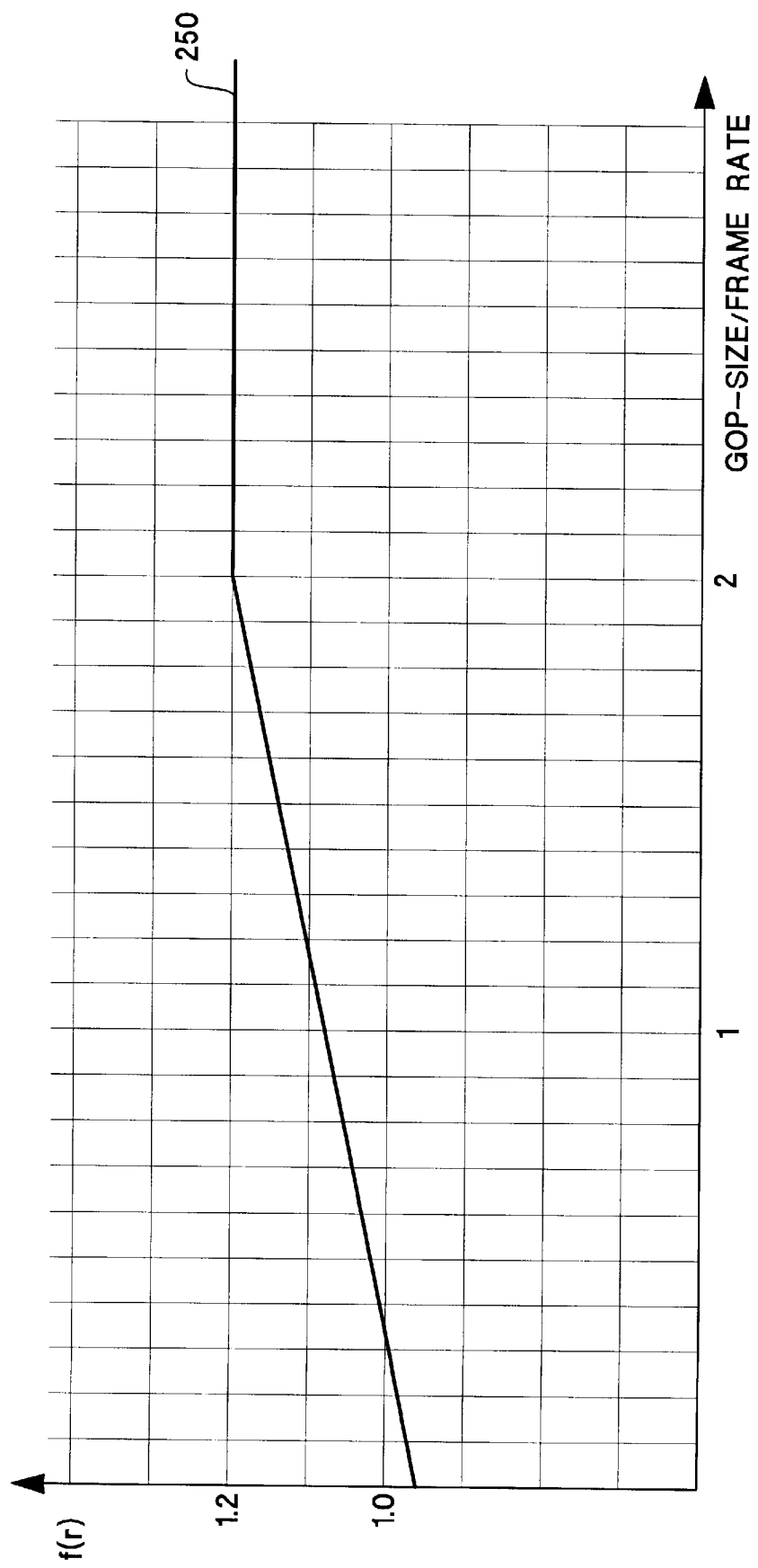
FIG. 16 shows the curve of the monotone increasing function $f(r)$.

The similarity detector 21 then normalizes the histogram difference with respect to the frame rate and frame size (i.e., GOP size) to obtain the first content difference $S_1$. The equation is as follows.

$$S_1 = D_1 / f(r)$$

wherein $f(r)$ is a monotone increasing function of variable r. The curve 250 of the monotone increasing function $f(r)$ is shown in FIG. 16, wherein r is GOP size of the compressed video data divided by the frame rate of the compressed video data.

Because the frames in the MPEG video data are in YUV color space, this color space can be used to form color code in order to avoid any color-space conversion in the construction of the DC histogram, thereby reducing computational cost. There are many ways to form the color code. In one embodiment, three most significant bits of DC coefficient of Y and one most significant bit of DC coefficient of U and V are concatenated to form a 5-bit color code for each block. In another embodiment, four most significant bits of DC coefficient of Y and one most significant bit of DC coefficient of U and V are concatenated to form a 6-bit color code for each block. In a further embodiment, four most significant bits of DC coefficient of Y and two most significant bits of DC coefficient of U and V are concatenated to form an 8-bit color code for each block. The first embodiment has less memory and computation power requirements than the last embodiment.

The comparator 22 then compares the first content difference $S_1$ with the threshold $T_S$. If $S_1$ is greater than $T_S$, the current GOP is detected to contain a sharp shot boundary. The frame at which the sharp shot boundary is located is referred to as the sharp shot boundary key frame. In this case, the comparator 22 generates a $G_1$ signal that causes the gate 19a to apply the compressed video data to the sharp shot boundary detector 16 to determine the exact location of the sharp shot boundary and to extract the sharp shot boundary key frame.

If the comparator 22 determines that $S_1$ is not greater than $T_S$, the comparator 22 activates the similarity detector 23 which detects the second content difference $S_4$. This process is substantially identical to that of the similarity detector 21 except that the previous frame of the second previous GOP is used. The equations used to calculate $S_4$ are the same as those used for calculating $S_1$ and therefore will not be described in more detail below.

The comparator 22 then compares the second content difference $S_4$ with the threshold $T_G$. If $S_4$ is greater than $T_G$, the current GOP is detected to contain a gradual shot boundary (or camera operation). The frame at which the gradual shot boundary is located is referred to as the gradual shot boundary or camera operation key frame. In this case, the comparator 22 generates a $G_2$ signal that causes the gate 19c to apply the compressed video data to the gradual shot boundary detector 17 to determine the exact location of the gradual shot boundary (or camera operation) and to extract the gradual shot boundary (or camera operation) key frame.

If $S_4$ is not greater than $T_G$, the current GOP is detected not to contain a gradual shot boundary (or camera operation). In this case, the comparator 22 generates a $G_3$ signal that causes gate 19b to apply the compressed video data to the key frame extractor 15 to extract a key frame with respect to a previously selected key frame.

Each of the similarity detectors 21 and 23 uses a novel difference metrics scheme to measure the content differences $S_1$ and $S_4$ effectively. This difference metrics scheme is independent of image size, external illumination changes, and has a large dynamic range. The difference metrics scheme will be described in more detail below, also in conjunction with FIGS. 17 and 18.

Figure 17:
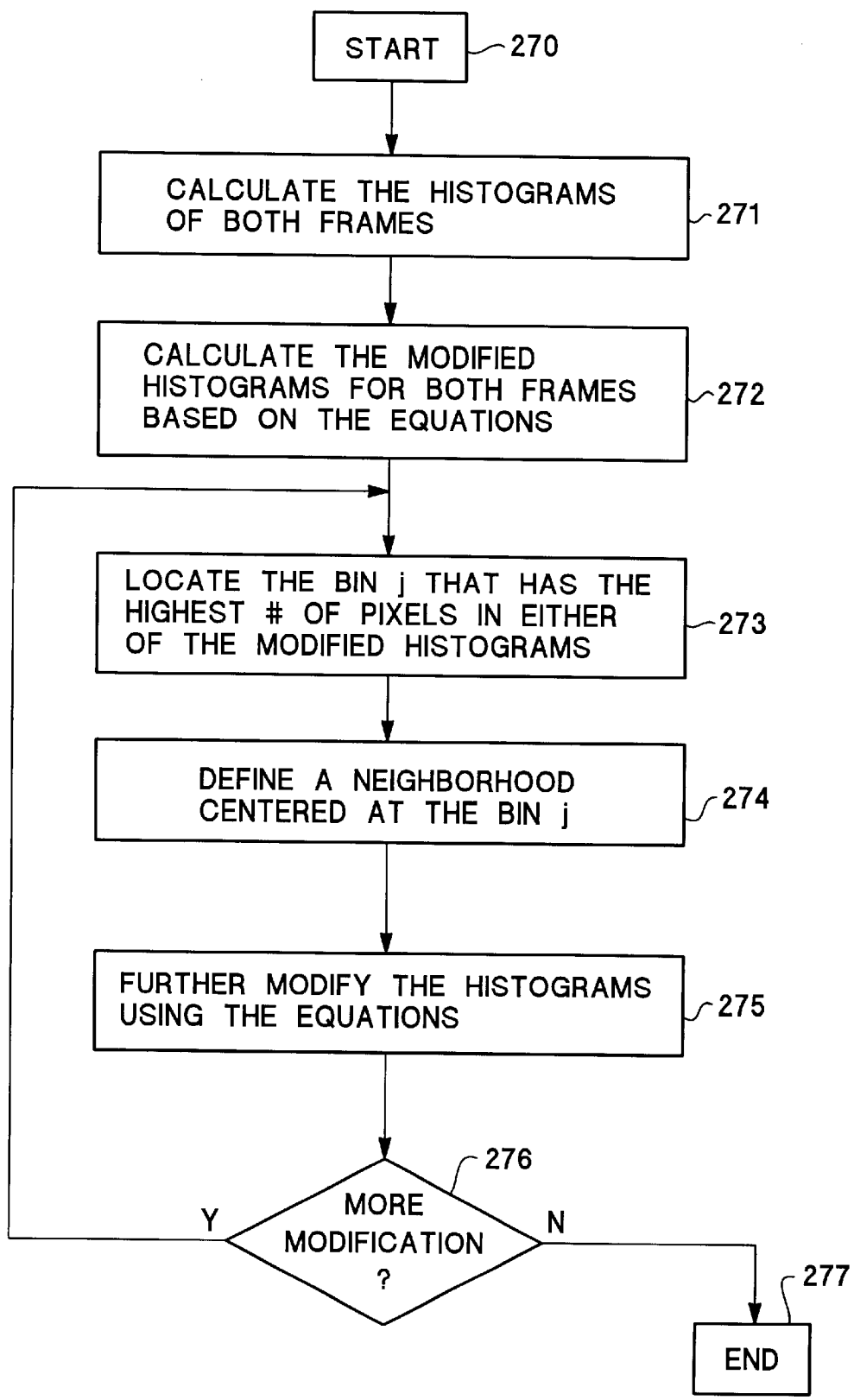
FIG. 17 is a flowchart diagram of a difference metrics scheme for each of the similarity detectors of FIG. 2.

FIG. 17 shows in flowchart diagram form the difference metrics scheme. As can be seen from FIG. 17, assume the current frame is labeled as the k frame and the prior frame of the previous GOP (i.e., either the first previous GOP or the fourth previous GOP) as the l frame. The process starts at the step 270. At the step 271, the histogram ($H_k$ or $H_l$) of each of the frames (i.e., k and l frames) is calculated using conventional methods (FIG. 18 shows the results of one such example). At the step 272, the modified histograms for both frames are calculated using the following equations.

$$H_k(i)=H_k(i)-\text{Min}\{H_k(i), H_l(i)\}$$

$$H_l(i)=H_l(i)-\text{Min}\{H_k(i), H_l(i)\}, \text{ for all i.}$$

The calculated results are shown in FIG. 18 for the example.

Then the process moves to the step 273 at which a bin (e.g., bin j) is located with the highest number of pixels in either one of the modified histograms. Bin is the variable for the histogram and can also be referred to as the histogram component. If the bin j is found to be in $H_k$, then $H_k$ becomes $H_{max}$ and $H_l$ becomes $H_{min}$. Otherwise, $H_l$ becomes $H_{max}$ and $H_k$ becomes $H_{min}$.

At the step 274, a neighborhood $\Omega$ is defined centered around the bin j. The neighborhood $\Omega$ is defined to be [j±N], wherein N is a predetermined integer. At the step 275, the histograms are updated using the following equations.

$$H_{max}(j) = H_{max}(j) - \sum_{s \in \Omega} 0.9^{|s-j|} H_{min}(s)$$

$$H_{min}(j) = H_{min}(j) - \sum_{s \in \Omega} 0.9^{|s-j|} H_{min}(s).$$

FIG. 18 shows the results after the step 275. As can be seen from FIG. 18, the bin 8 has the highest pixel number (i.e., 7) for $H_l$. Therefore, $H_l$ is now the $H_{max}$ and $H_k$ is now $H_{min}$. At the step 275, the pixel number 4 of $H_k$ (i.e., $H_{min}$) is multiplied by 0.9 (Here, $|s-j|=|7-8|=1$) and the result is subtracted from the pixel number 7 of the bin 8 of $H_l$. The steps 273 through 275 are repeated until at the step 276 it is determined that $H_{min}$ (in this case $H_k$) is zero for any neighborhood $\Omega$. FIG. 19 shows the subsequent results the example shown in FIG. 18 until the histogram for all bins of the k frame becomes zero. Each of the reference numbers 290–300 indicates the modified histograms after one execution round of the steps 273–275 of FIG. 17.

After that, the difference Diff (i.e., $S_1$ or $S_4$) between the two frames k and l can be obtained using the following equation $$\text{Diff}=\Sigma\{H_k(i)+H_l(i)\}.$$

Figure 3:
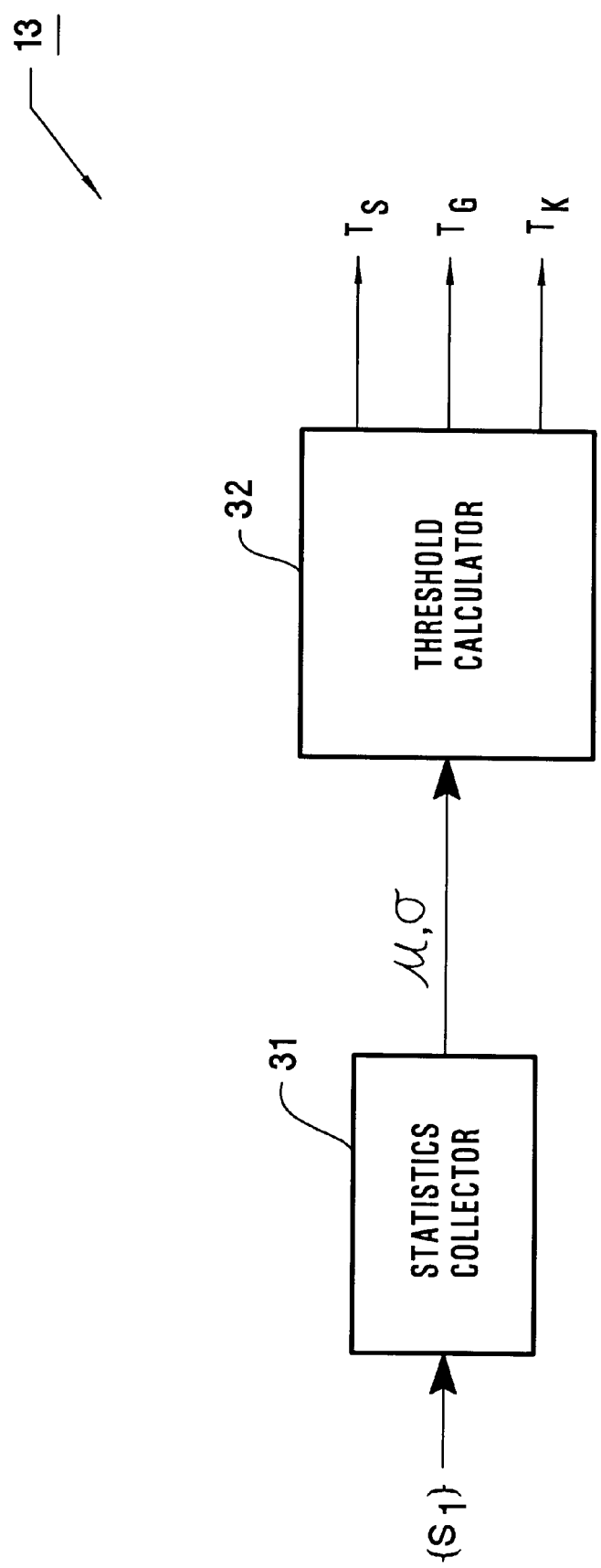
FIG. 3 shows the structure of the threshold selection unit.

FIG. 3 shows the structure of the threshold selection unit 13. As can be seen from FIG. 3, the threshold selection unit 13 includes a statistics collector 31 and a threshold calculator 32. The threshold calculator 32 is connected to the statistics collector 31. The threshold calculator 32 is used to generate the thresholds $T_S$, $T_G$, and $T_K$ that are then sent to the difference detector 14 and the shot boundary detection and key frame extraction module 11. The statistics collector 31 is used to collect all the prior first content differences (i.e., $\Sigma S_1$) generated by the difference detector 14 up to the moment when the current GOP is received by the difference detector 14. The statistics collector 31 then calculates the mean and standard deviation (i.e., $\mu$ and $\sigma$) of the statistics collected.

Once the statistics collector 31 calculates the values of mean $\mu$ and standard deviation $\delta$, the threshold calculator 32 then calculates each of the thresholds $T_S$, $T_G$, and $T_K$ as function of $\mu$ and $\delta$. In one embodiment, the thresholds are calculated based on the following equations.

$$T_S=(\mu+\beta_S\times\sigma)\times\rho+(1-\rho)\times T_{S\_fixed} \quad (1)$$

$$T_G=(\mu+\beta_G\times\sigma)\times\rho+(1-\rho)\times T_{G\_fixed} \quad (2)$$

$$T_K=(\mu+\beta_k\times\sigma)\times\rho+(1-\rho)\times T_{K\_fixed} \quad (3)$$

wherein $\beta_S=\gamma\times\beta_{S\_fixed}$, $\beta_G=\gamma\times\beta_{G\_fixed}$, and $\beta_K\gamma\times\beta_{k\_fixed}$. $\beta_{S\_fixed}$, $\beta_{G\_fixed}$, $\beta_{k\_fixed}$ are all predetermined numbers. In one embodiment, $\beta_{S\_fixed}$ is approximately 1.5 $\beta_{G\_fixed}$ is approximately 0.75 and $\beta_{K\_fixed}$ is approximately 2.00.

$\gamma$ represents memory constraints of the key frame storage or buffer that stores all the extracted key frames. Thus, $\gamma$ is determined by the size of the key frame buffer. Providing $\gamma$ allows the a shot boundary and key frame detection system 10 of FIG. 1 to regulate or adjust the key frame density so that the key frames can fit into the memory space of the key frame buffer. $\gamma$ can be set at a default value of one. When this occurs, the system 10 does not regulate the key frame density.

$\rho$ is equal to $10^{-i/\tau}$, wherein i represents the number of key frames allowed per shot (i.e., key frame density) and $\tau$ is a predetermined number selected between 300 to 1000. There are three density levels for extracting and storing key frames. These three density levels are low density, medium density, and high density. The low density level allows one key frame per shot. The medium density level regulates the number of key frames per shot in accordance with the open space left in the key frame storage buffer. The high density level does not have any memory regulation and allows as many key frames per shot as there are.

$T_{S\_fixed}$, $T_{G\_fixed}$, and $T_{K\_fixed}$ are also predetermined numbers. In one embodiment, $T_{S\_fixed}$ is approximately 1.50. $T_{G\_fixed}$ is approximately 1.25 and $T_{K\_fixed}$ is approximately 1.50. Alternatively, $T_{S\_fixed}$, $T_{G\_fixed}$, and $T_{K\_fixed}$ may have other numbers.

Figure 4:
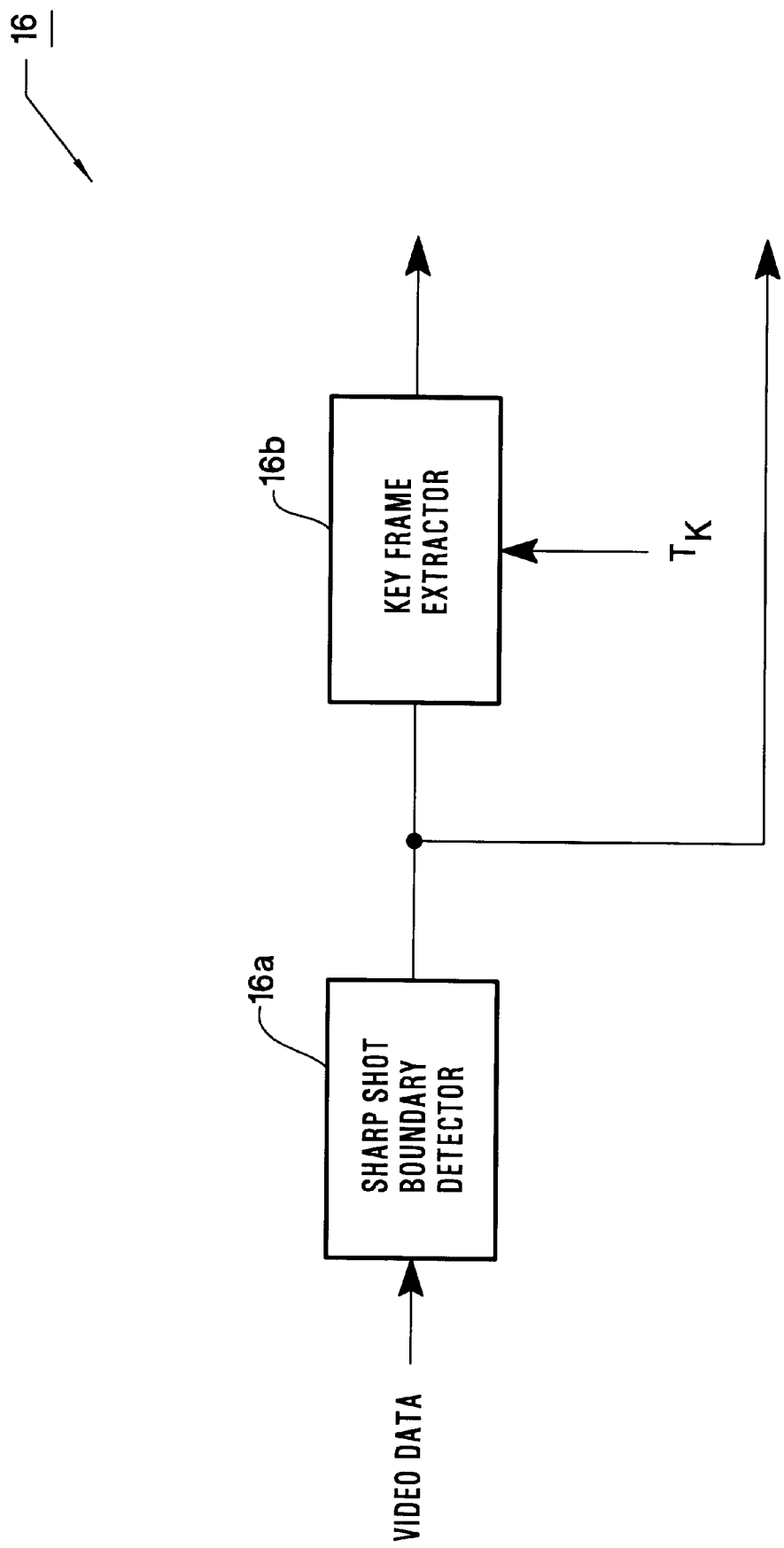
FIG. 4 shows the structure of the sharp shot boundary detector of the shot boundary detection and key frame extraction system of FIG. 1.

FIG. 4 shows the structure of the sharp shot boundary detector 16 of FIG. 1. As can be seen from FIG. 4, the sharp shot boundary detector 16 includes a sharp shot boundary detector 16a and a key frame extractor 16b. The sharp shot boundary detector 16a is used to determine the exact location of the sharp shot boundary within the current GOP with respect to the first previous GOP using the compression information from the compressed video data. The key frame extractor 16b is used to extract the video frame at that location and label that frame as a sharp shot boundary key frame using the compression information from the compressed video data. The extracted key frame is then stored in the key frame storage buffer (not shown) and the key frame storage buffer is updated to indicate that the stored key frame is the most recently stored key frame or simply last key frame.

The sharp shot boundary detector 16a examines I, P, and B pictures or frames within the current GOP to determine the sharp shot boundary. The sharp shot boundary detector 16a does a frame-by-frame examination to determine the location. The sharp shot boundary detector 16a uses the MB mode information to detect the location of the sharp shot boundary. The sharp shot boundary detector 16a determines the sharp shot boundary (SSB) location in accordance with the following.

If the SSB occurs at a P frame, then the majority of the MB modes of the P frame should be intra-coded or skipped. They should not be forward-predicted. The B frames preceding the P frame which use the P frame as the reference frame should not have backward-predicted MB modes. The majority of such MB modes of such B frames should be either skipped or forward predicted.

If SSB occurs at a B frame, then the majority of the MB modes of the B frame should be backward-predicted. There should be very few forward-predicted modes.

If SSB occurs at an I frame, then the percentage of skipped MB modes should be very low.

FIGS. 5 and 6A–6C show the process of locating the sharp shot boundary by the sharp shot boundary detector 16a, which will be described in more detail below.

Figure 5:
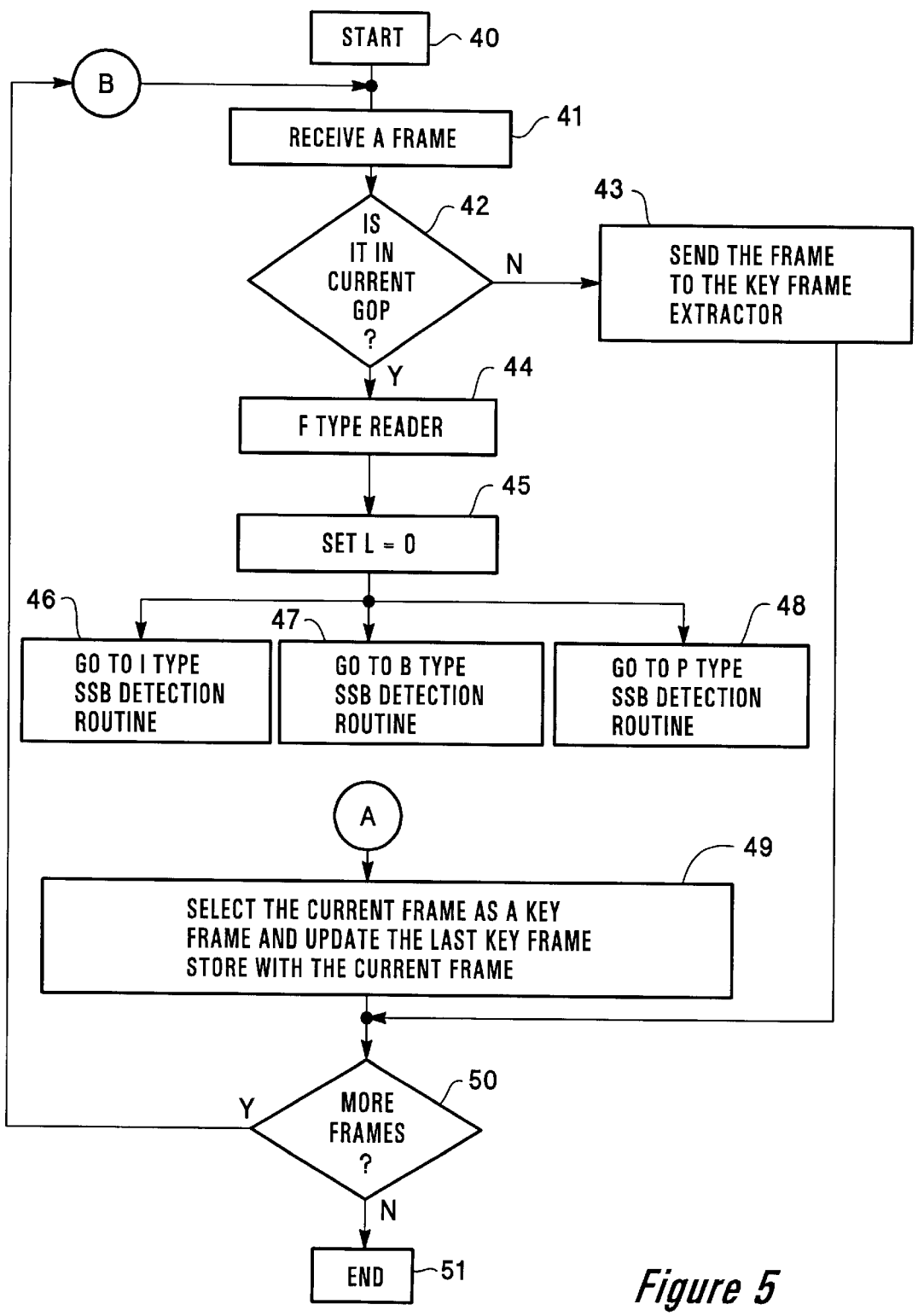
FIG. 5 shows in flow chart diagram form the routine of the sharp shot boundary detector of FIG. 4.

As can be seen from FIG. 5, the process for the sharp shot boundary detector 16a starts at the step 40. At the step 41, a frame is received in the detector 16a. At the step 42, it is determined if the current frame is within the current GOP. If so, the step 44 is performed. If not, the process moves to the step 43 at which the frame is sent to the key frame extractor 16b to extract the key frame. The process then moves to the step 50.

Figure 6A:
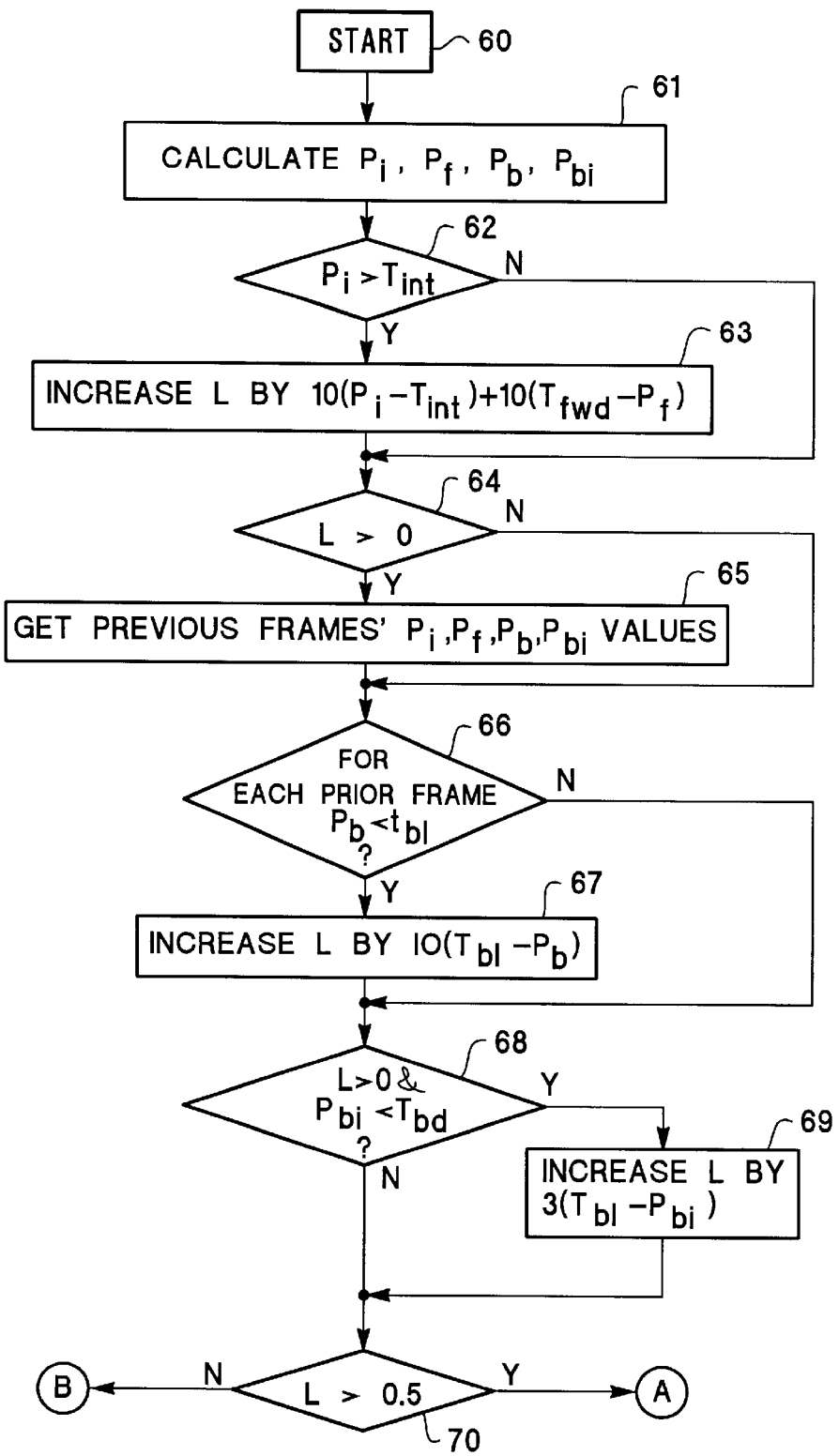
FIGS. 6A through 6C show in flow chart diagram form the subroutines employed in the routine of FIG. 5.
Figure 6B:
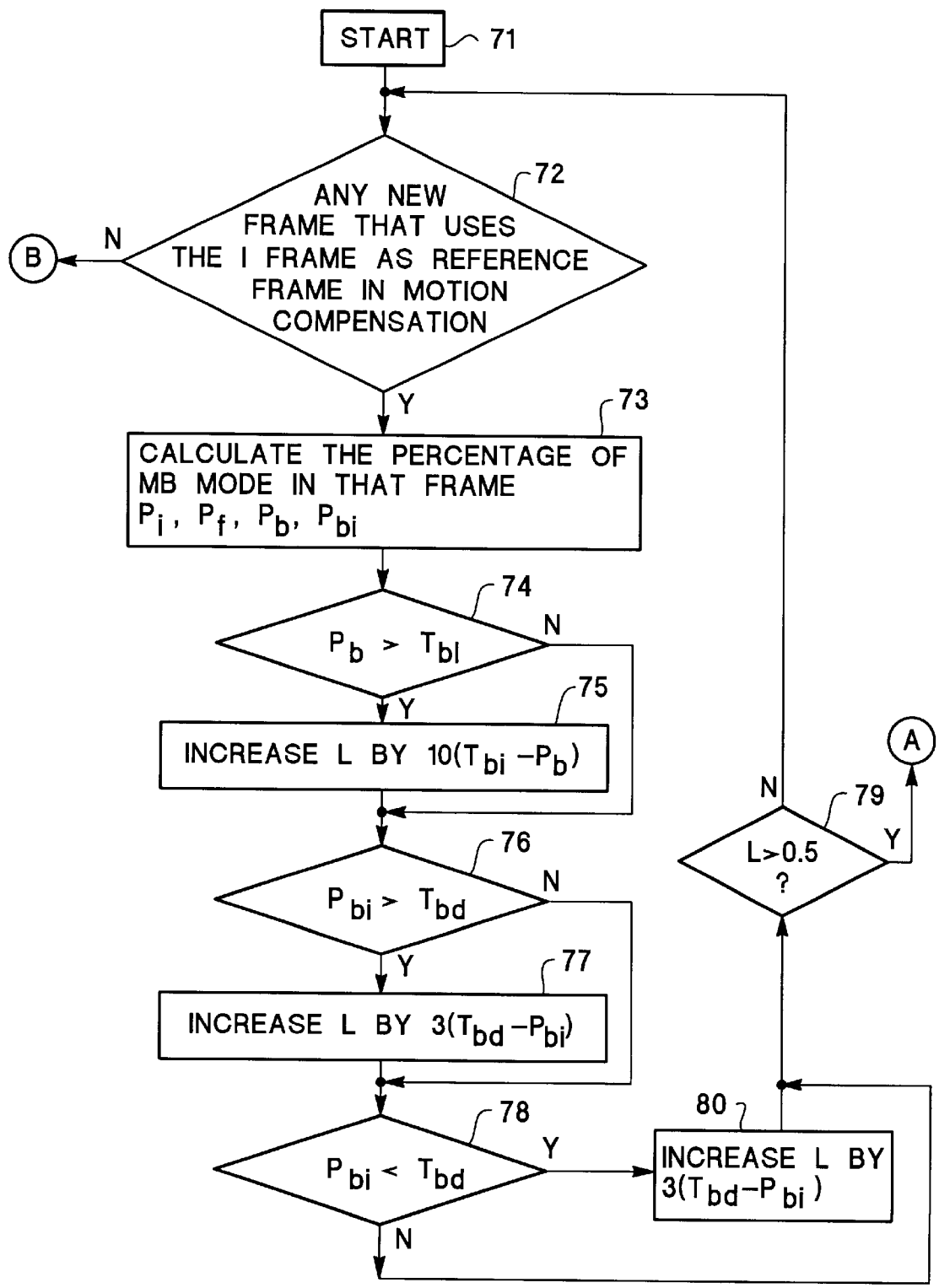
Figure 6C:
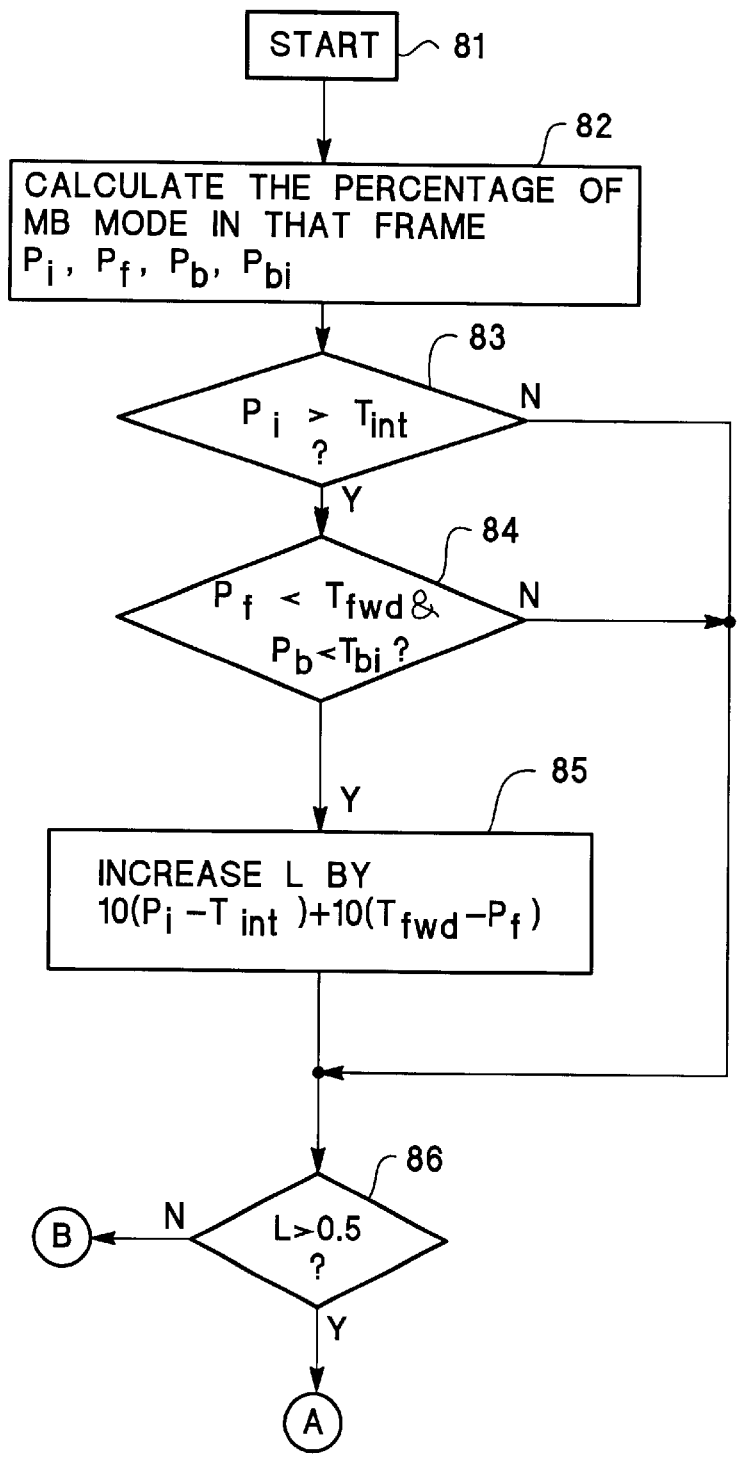

At the step 44, the process determines the type of the frame received. At the step 45, the variable L is set to zero. Then the process calls the I, B, or P type subroutine at the steps 46–48 depending on the type of the frame received. This means that if the received frame is I type, then the step 46 is executed. FIG. 6A shows the P-type sub-routine, FIG. 6B shows the I-type sub-routine, and FIG. 6C shows the B-type. sub-routine.

After the execution of one of the sub-routines, the process returns to the step 49 at which the current frame is selected as the key frame and the last key frame store (not shown) is updated with the current frame. The key frame store stores all key frames selected in a first-in-last-out sequential order. Then at the step 50, it is determined if more frames are received at the detector 16a. If so, the process returns to the step 41. If not, the process ends at the step 51.

In FIG. 6A, the P-type sub-routine starts at the step 60. At the step 61, the percentage of each macro-block mode of the frame is calculated. As described above, $P_i$ indicates the percentage of intra macro-block mode, $P_f$ indicates the percentage of forward-predicated macro-block mode, $P_b$ indicates the percentage of backward-predicated macro-block mode, $P_{bi}$ indicates the percentage of bidirectionally-predicated macro-block mode. At the step 62, it is determined if $P_i$ is greater than the predetermined threshold $T_{int}$. If so, the step 63 is performed at which the variable L is increased by $10(P_i-T_{int})+10(T_{fwd}-P_f)$. If not, the step 63 is skipped.

In one embodiment, each of the predetermined thresholds $T_{int}$, $T_{fwd}$, $T_{bd}$, and $T_{bl}$ has a value of one. Alternatively, the value for these predetermined thresholds may be greater or less than one.

At the step 64, it is determined if L is greater than zero. If so, the step 65 is performed at which the $P_i$, $P_f$, $P_b$, and $P_{bl}$ values of the previous frames are obtained. If not, the step 65 is skipped. The step 66 is another determination step at which it is determined if $P_b$ is less than $T_{bl}$ for each previous frame. If not, the step 67 is skipped. If so, the step 67 is performed at which the variable L is increased by $10(T_{bl}-P_b)$. Then the step 68 is performed to determine if L is greater than zero and $P_{bi}$ is less than $T_{bd}$. If so, the step 69 is performed to increase L by $3(T_{bl}-P_{bi})$. If not, the step 69 is skipped. Then the step 70 is performed to determine if L is greater than 0.5. If so, the process returns to the step 49 of FIG. 5. If not, the process returns to the step 41 of FIG. 5.

In FIG. 6B, the I-type sub-routine starts at the step 71. At the step 72, it is determined if there is any new frame that uses the I frame as reference frame in motion compensation. If not, the process returns to the step 41 of FIG. 5. If so, the step 73 is performed to calculate the percentage of each macro-block mode of the frame (i.e., $P_i$, $P_f$, $P_b$, and $P_{bi}$) At the step 74, it is determined if $P_b$ is greater than the predetermined threshold $T_{bl}$. If so, the step 75 is performed at which the variable L is increased by $10(T_{bi}-P_b)$. If not, the step 75 is skipped.

At the step 76, it is determined if $P_{bi}$ is greater than $T_{bd}$. If so, the step 77 is performed at which L is increased by $^3(T_{bd}-P_{bl})$ If not, the step 77 is skipped. Then the step 78 is performed at which it is determined if $P_{bi}$ is greater than $T_{bd}$. If so, the step 80 is performed at which L is increased by $3(T_{bd}-P_{bi})$. If not, the step 80 is skipped. Then the step 79 is performed to determine if L is greater than 0.5. If so, the process returns to the step 49 of FIG. 5. If not, the process returns to the step 41 of FIG. 5.

In FIG. 6C, the B-type sub-routine starts at the step 81. At the step 82, the percentage of each macro-block mode of the frame (i.e., $P_i$, $P_f$, $P_b$, and $P_{bi}$) is calculated. At the step 83, it is determined if $P_i$ is greater than $T_{int}$. If so, the step 84 is performed. If not, the process moves to the step 86. At the step 84, it is determined if $P_f$ is less than $T_{fwd}$ and $P_b$ is less than $T_{bi}$. If so, the step 85 is performed. If not, the process moves to the step 86. At the step 85, L is increased by $10(P_i-T_{int})+10(T_{fwd}-P_f)$. Then the step 86 is performed at which it is determine if L is greater than 0.5. If so, the process returns to the step 49 of FIG. 5. If not, the process returns to the step 41 of FIG. 5.

Referring again to FIG. 4, when the sharp shot boundary detector 16a detects the SSB location, the key frame extractor 16b is then used to extract the video frame at the SSB location and to label that frame as SSB key frame. The SSB key frame is then stored into the key frame storage buffer. The process of extracting a key frame is described in more detail below, also in conjunction with FIG. 9.

Figure 7:
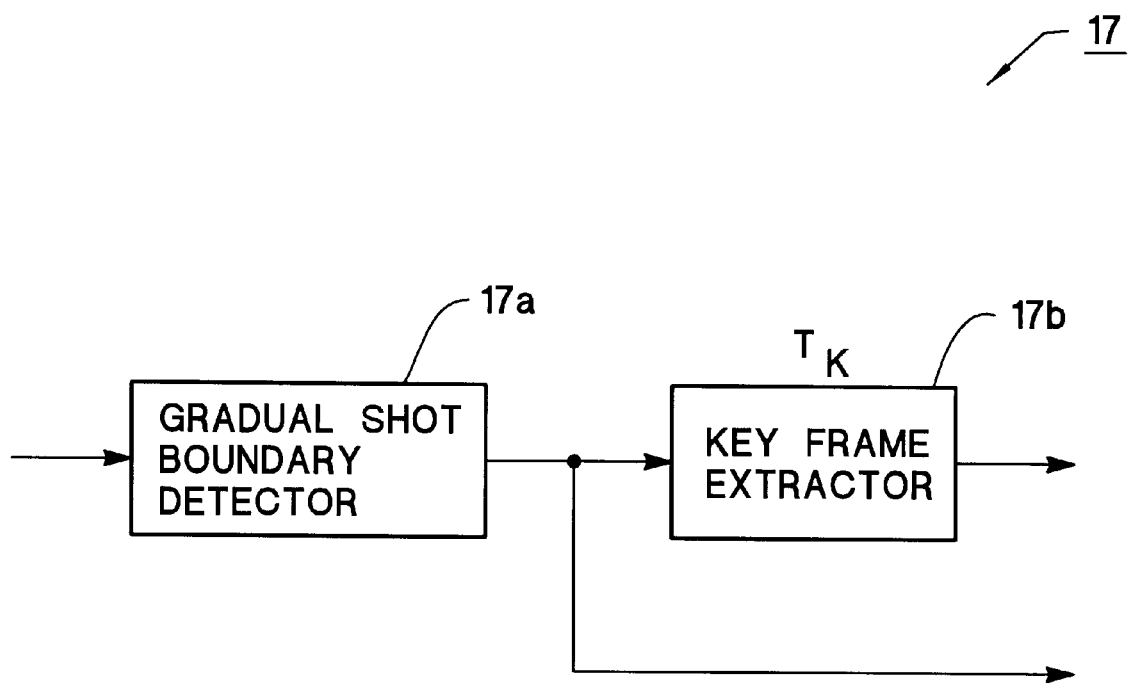
FIG. 7 shows the structure of the gradual shot boundary detector of the shot boundary detection and key frame extraction system of FIG. 1.
Figure 12:
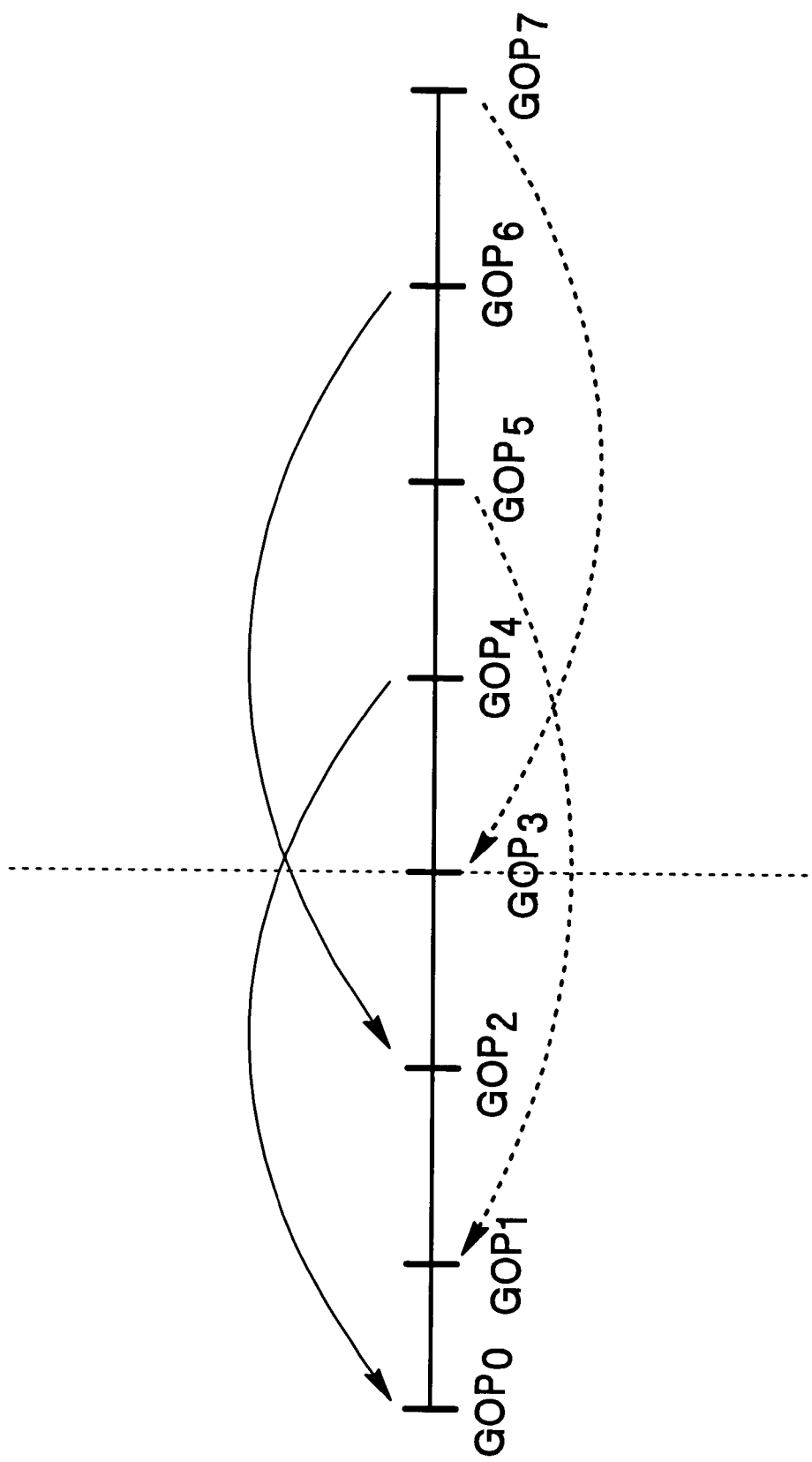
FIG. 12 shows one example of gradual shot transitions between Group of Pictures (GOPs).

FIG. 7 shows the structure of the gradual shot boundary detector 17 of FIG. 1. As can be seen from FIG. 7, the gradual shot boundary detector 17 includes a gradual shot boundary detector 17a and a key frame extractor 17b. The gradual shot boundary detector 17a is used to determine the exact location of the gradual shot boundary within the current GOP. A gradual shot refers to a transition from one shot to another that takes more than one GOP length. In fact, the transition may span several GOPs, as can be seen from FIG. 12. FIG. 12 shows one example of gradual shot transitions between GOPs. To detect the gradual shot boundaries, the gradual shot boundary detector 17a compares the DC histogram of the I frame of the current GOP with that of the I frame of a Nth previous GOP (e.g., the fourth previous GOP). If the normalized content or histogram difference (i.e., $S_4$) is larger than a gradual shot boundary detection threshold $T_{br}(i)$, the gradual shot boundary detector 17a then examines the camera operations, such at pan and zoom. Thus the gradual shot boundary detector 17a includes a pan detector (not shown in FIG. 7) and a zoom detector (also not shown in FIG. 7).

Figure 13C:
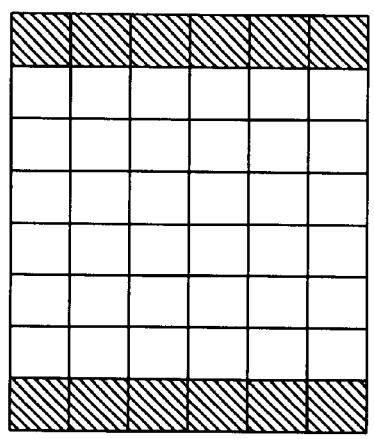
FIGS. 13A through 13C show the characteristics of an ideal pan operation.
Figure 13B:
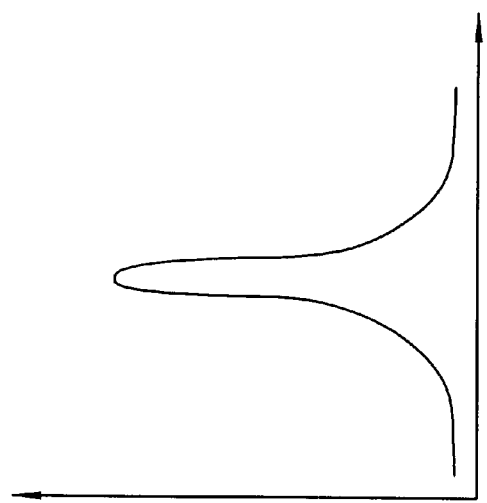
Figure 13A:
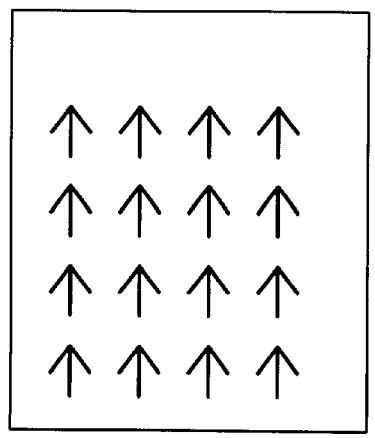
Figure 14C:
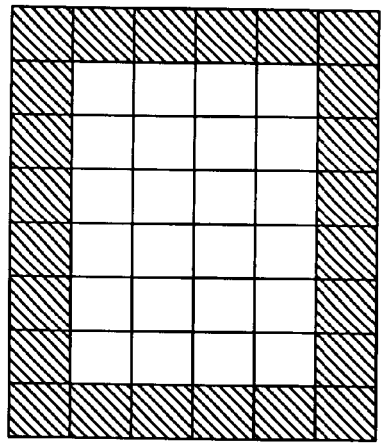
FIGS. 14A through 14C show the characteristics of an ideal zoom operation.
Figure 14B:
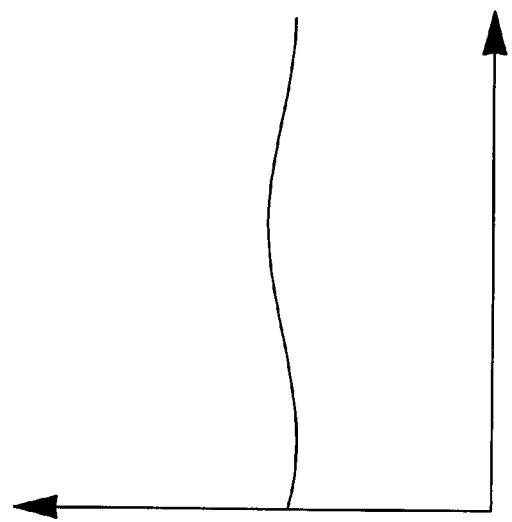
Figure 14A:
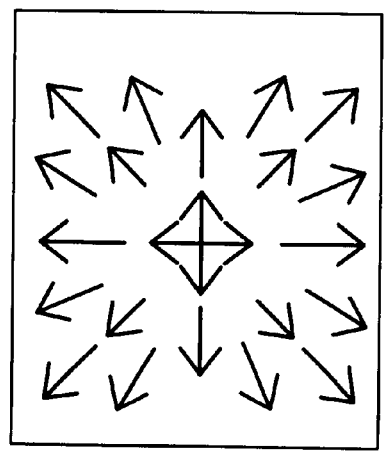

The characteristics of an ideal pan and zoom helps the camera operation detection. FIG. 13A shows an ideal pan pattern. FIG. 13B shows the number of motion vectors versus angles of the motion vectors with respect to the horizontal axis for the pan. FIG. 13C shows that the MB modes at the border of such an ideal pan frame are different from the MB modes within the frame due to occlusion. FIG. 14A shows an ideal zoom pattern. FIG. 14B shows the number of motion vectors versus angles of the motion vectors with respect to the horizontal axis for the zoom. FIG. 14C shows that the MB modes at the border of such an ideal pan frame are different from the MB modes within the zoom frame due to occlusion.

The gradual shot boundary detector 17a uses the reliable motion vectors and MB mode information from the compressed video data to determine the pan and zoom frames. However, as is known, motion vectors in a compressed video data are nothing but prediction vectors. In addition, due to aperture problem, only the component of the motion vectors normal to the spatial image gradients can be estimated. Therefore, the motion vectors over the homogeneous areas may be spurious. To determine the reliable motion vectors, the gradual shot boundary detector 17a employs the following scheme to determine the reliable motion vectors in a frame.

If the frame to be detected is B-type picture frame, then only the bidirectional motion vectors are used to detect the reliable motion vectors. If a forward motion vector and an inverse backward motion vector have substantially the same magnitude and direction (i.e., within a predetermined threshold), these motion vectors are deemed to be reliable. The ratio of the magnitude of the forward and backward motion vectors is between 0.8 and 1.2. The angle between the forward and backward motion vectors is less than 30°.

If the frame to be detected is P-type picture frame, then the AC coefficients of DCT (i.e., discrete cosine transform) transform of each macro block of the frame are examined to determine if high frequency components of DCT are included in the macro block. This is done by summing the first column and first row of quantified DCT coefficients of the macro block. If the sum is greater than a predetermined threshold, then the motion vector associated with the macro block is deemed to be reliable.

To detect pan and zoom frame, the gradual shot boundary detector 1 7a uses the MB information. This is because the MB modes are different at the borders of the frame from the MB modes within the frame, as can be seen from FIGS. 13C and 14C. For pan frame detection, the gradual shot boundary detector 17a first normalizes the reliable motion vectors in the frame and calculates the total number of the reliable motion vectors. If the sum is smaller than a predetermined threshold, then the gradual shot boundary detector 17a does a border checking which is described below. Otherwise, the frame is not a pan frame.

Then the gradual shot boundary detector 17a validates the pan frame by boarder checking. As described above, if the frame is a pan frame, the borders of the frame are more likely to be occluded (see FIGS. 13A and 13B). Therefore, MB modes at the borders are different due to this occlusion effect. If the difference is significant (i.e., greater than a predetermined level), the frame is deemed as a pan frame.

For zoom detection, the gradual shot boundary detector 17a repeats the above described process with different predetermined thresholds.

Figure 15:
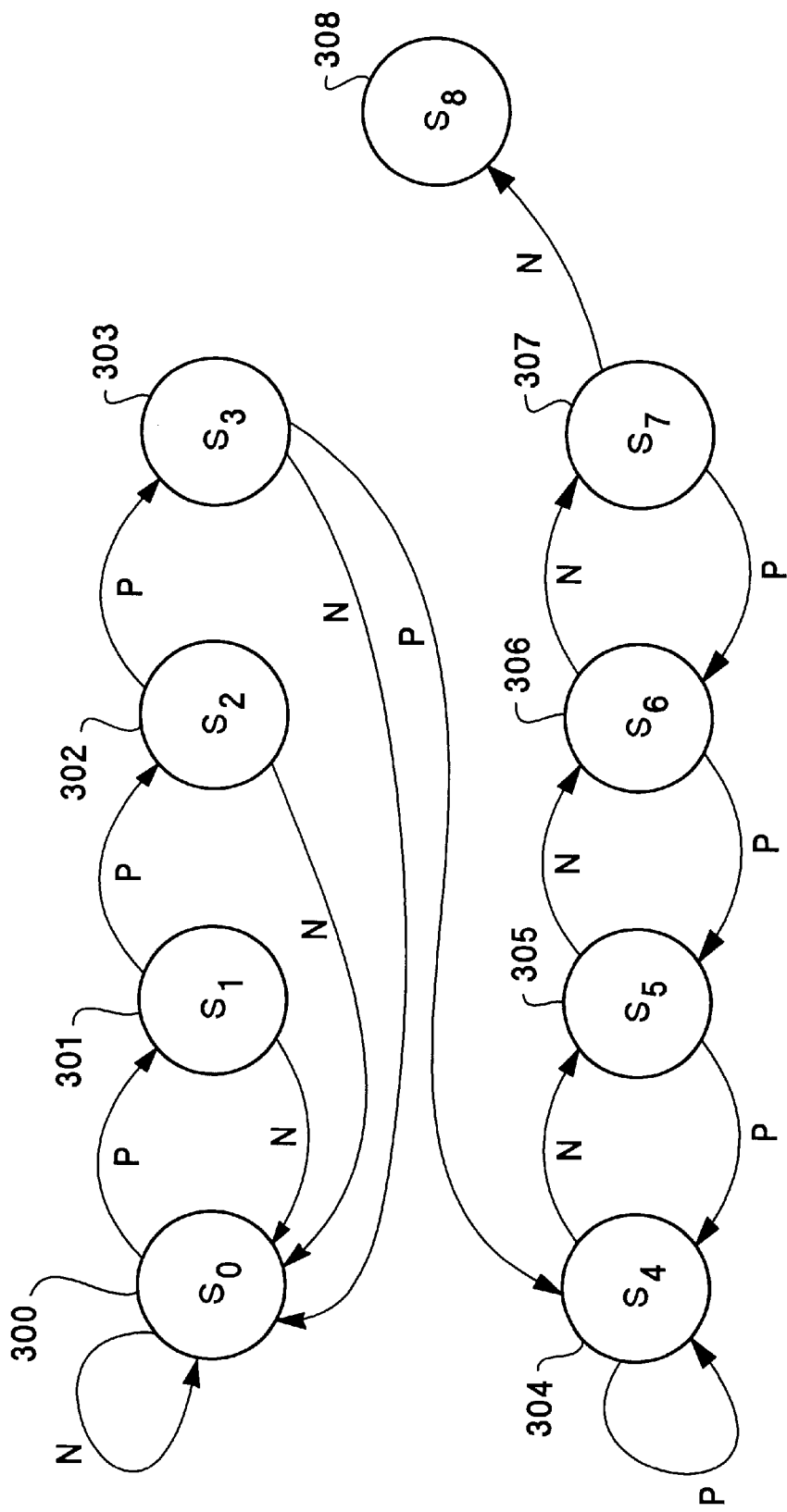
FIG. 15 shows the state diagram of the process of detecting if a collection of pan key frames are from a pan or not.

The construction of zoom/pan segment from individual frame is done using a state-graph method which is shown in FIG. 15. As can be seen from FIG. 15, the state graph depicts the detection of a pan as an example. The same graph can be used to detect a zoom. The state graph can be implemented using any known state machine technology. As seen from FIG. 15, the $S_0$ state 300 is the starting state and the $S_8$ state 308 is the ending state. The pan exist states are the states 304 through 307 and the no pan states are the states 300–303 and 308. The detection process starts at the $S_0$ state 300. If a predetermined number (e.g., three) of successive pan frames have been detected, then the pan is detected to have started. Likewise, if a predetermined number (here again three as an example) of successive non-pan frames have been detected, the pan has stopped. This diagram applies to zoom detection.

The key frame extractor 17b is used to extract the video frame at that location and label that frame as a key frame. The process of extracting a key frame is described in more detail below, also in conjunction with FIG. 9.

In addition, the key frame extractor 17b (as well as the key frame extractor 16b) also includes the function to select multiple key frames within a shot using an iterative scheme. This is described as follows, also in conjunction with FIG. 20.

Figure 20:
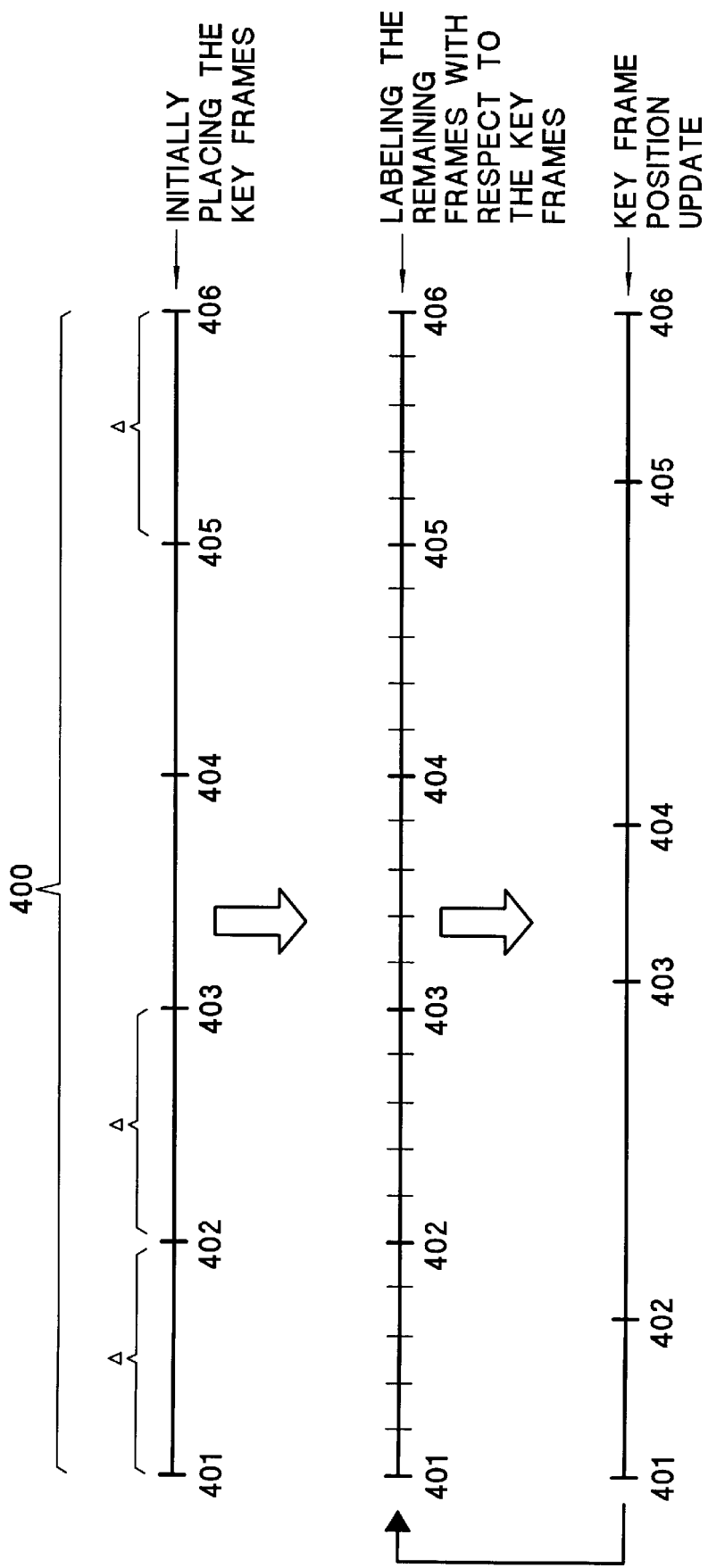
FIG. 20 shows the process of selecting multiple key frames within a shot using an iterative scheme.

As can be seen from FIG. 20, the key frames 401 through 406 are initially evenly picked within the shot 400. Then the other frames within the shot 400 are labeled as close to one of the key frames 401–406 in accordance with their histograms. This classifies each of the frames within the shot 400 into a number of clusters (in this example, five clusters). The locations of these key frames 401–406 are then updated to be the center of these clusters. The scheme iterates between these clustering and position update steps until they converge.

Figure 8A:
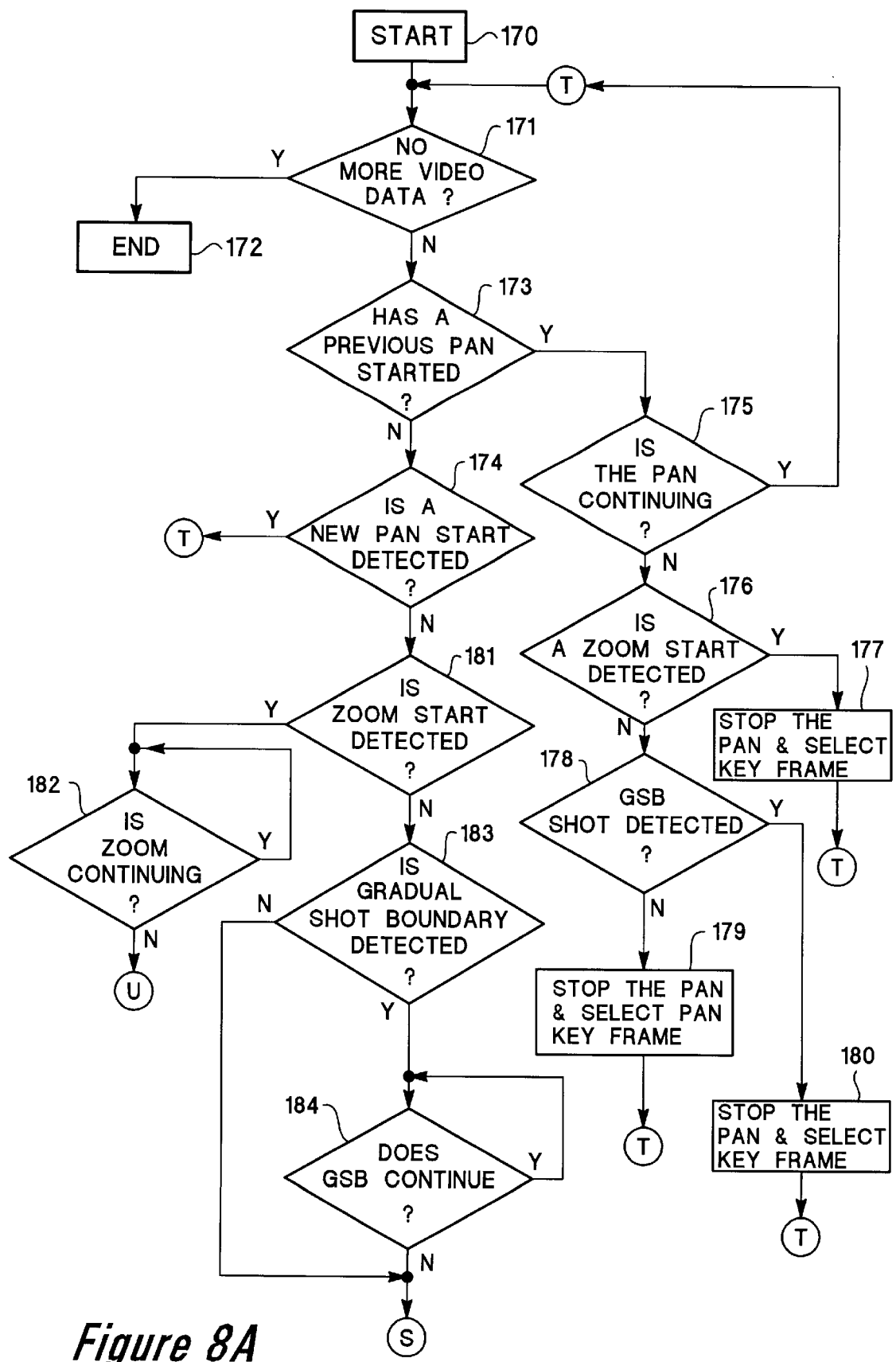
FIG. 8A and 8B show in flow chart diagram form the routine of the gradual shot boundary detector of FIG. 7.
Figure 8B:
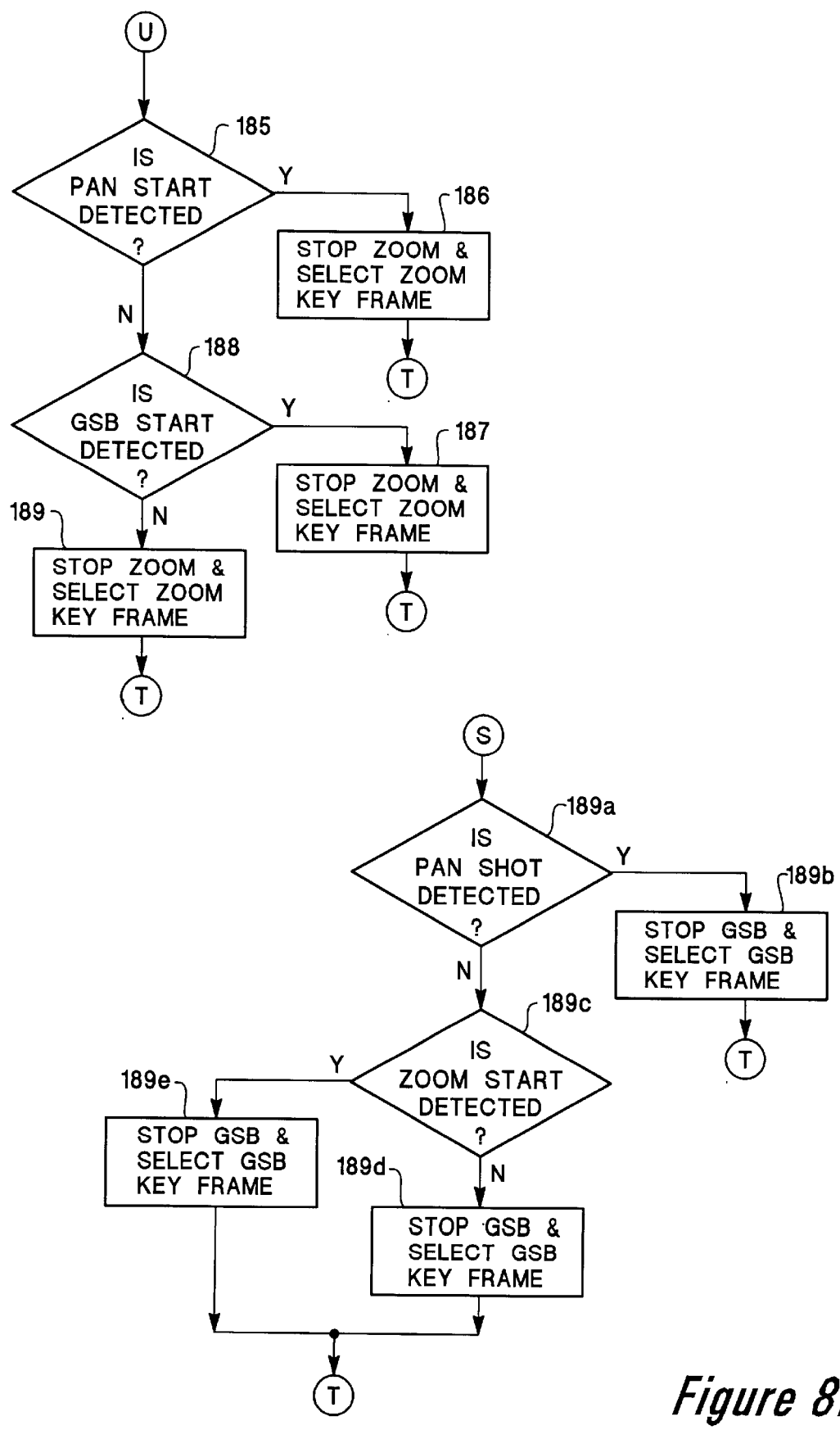

FIGS. 8A and 8B show in flow chart diagram form the process of detecting gradual shot boundary, pan operation, and/or zoom operation by the gradual shot boundary detector 17a of FIG. 7. As can be seen from FIGS. 8A and 8B, the process starts at the step 170. At the step 171, it is determined if the process should end. If so, the process ends at the step 172. If not, the step 173 is performed to determine if a previous pan has started. If so, the step 175 is performed to determine if the current frame continues the pan. If so, the process returns to the step 171. Otherwise the step 176 is performed.

At the step 176, it is determined if the current frame starts a zoom. If so, the pan is stopped and the key frame is selected at the step 177. The process then moves to the step 171. If, on the other hand, there is no zoom detected at the step 176, then the step 178 is performed to determine if a gradual shot boundary is detected. If so, the step 180 is performed to stop the pan and select the key frame. The process then returns to the step 171.

If, at the step 178, it is determined that a gradual shot boundary is not detected, then the step 179 is performed to stop the pan and select the key frame. The process then returns to the step 171.

If, at the step 173, it is determined that there is no previous pan, then the step 174 is performed to determine if the current frame starts a new pan. If so, the process returns to the step 171. If not, the step 181 is performed to determine if the current frame starts a zoom. If so, the step 182 is performed to determine when the zoom ends. Once the zoom is detected to end, then the step 185 is performed to detect if the current frame starts a pan. If so, the step 186 is performed to stop zoom and select the zoom key frame. The process then returns to the step 171. If not, the step 188 is performed to determine if a gradual shot boundary is detected. If so, the step 187 is performed to stop the zoom and select the zoom key frame. The process then returns to the step 171. If, at the step 188, the answer is no, then the step 189 is performed to stop the zoom and select the zoom key frame. The process then ends at the step 171.

If, at step 181, it is determined that the current frame does not start a zoom, the step 183 is performed to determine if a gradual shot boundary is detected. If so, the step 184 is performed until the zoom stops. If not, the step 184 is skipped and the process moves to the step 189a at which it is determined whether a pan shot is detected. If so, the step 189b is performed to stop the gradual shot boundary and select the GSB key frame. The process then moves to the step 171. If not, the step 189c is performed to determine if a zoom is started. If so, the step 189e is performed to stop the gradual shot boundary and select the GSB key frame. If not, the step 189d is performed to stop the gradual shot boundary and select the GSB key frame. The process then returns to the step 171.

Figure 9:
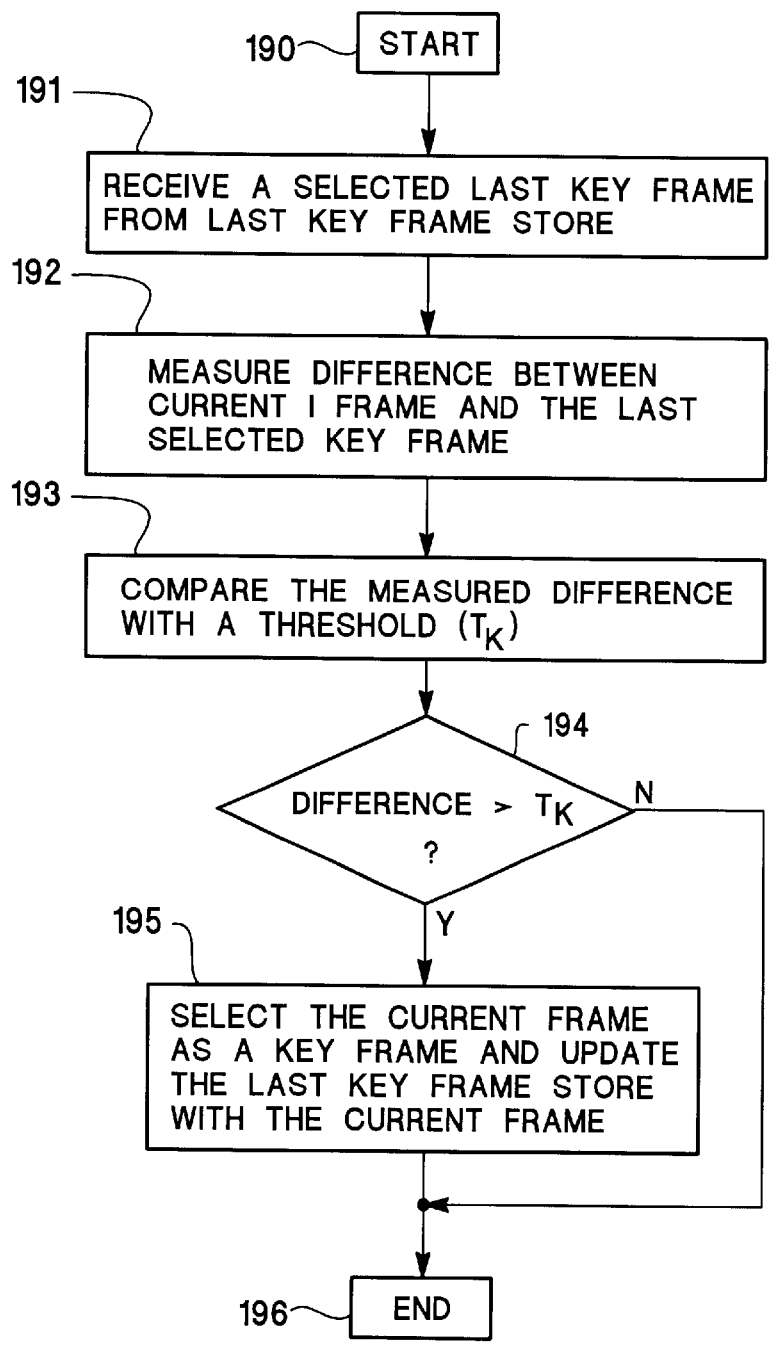
FIG. 9 shows in flow chart form the routine for any of the key frames shown in FIGS. 1, 4, and 7.

FIG. 9 shows in flow chart diagram form the routine of any one of the key frame extractors 15 (FIG. 1), 16b (FIG. 4), and 17b (FIG. 7). This means the key frame extractors 15, 16b, and 17b share the same structure. As can be seen from FIG. 9, the routine starts at the step 190. At the step 191, a selected last key frame is received from the last key frame store (not shown). At the step 192, the current 1 frame is compared with the selected last key frame to obtain a similarity or difference value. At the step 193, the difference value is compared against the threshold $T_K$. As described above, the threshold $T_K$ is generated and supplied by the threshold selection unit 13 of FIG. 1. The step 194 is a determination step at which it is determined if the difference value is greater than the threshold $T_K$. If so, the step 195 is performed, at which the current frame is selected as a key frame and the last key frame storage buffer is updated with the current frame. Then, the routine ends at the step 196. If, at the step 194, the difference value is not greater than the threshold $T_K$, the routine ends at the step 196.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A system for detecting shot boundaries in a compressed video data, comprising:
   (A) a difference detector that detects content differences between a current frame and previous frames of previous groups of frames;
   (B) a sharp shot boundary detector to detect a sharp shot boundary between the current frame and a previous frame of a first previous group of frames when the difference detector determines that a first content difference between the current frame and the previous frame of the first previous group of frames is greater than a first threshold;
   (C) a gradual shot boundary detector that detects a gradual shot boundary between the current frame and a previous frame of a second previous group of frames when the difference detector determines that (1) the first content difference is not greater than the first threshold and (2) a second content difference between the current frame and the previous frame of the second previous group of frames is greater than a second threshold; and
   (D) a key frame extractor that extracts multiple key frames from a detected shot using an iterative algorithm, wherein the iterative algorithm allows the key frame extractor to extract the multiple key frames from the shot by
      (a) selecting the multiple key frames within the shot at a constant interval;
      (b) adjusting the location of the selected key frames based on their histograms and the histograms of their adjacent frames within the shot until the histogram of a key frame is substantially the same as that of its subsequent frames.

2. The system of claim 1, wherein the gradual shot boundary detector further comprises
   (a) a pan detector that detects pan frames;
   (b) a zoom detector that detects zoom frames;
   (c) a key frame extractor that extracts a video frame as a key frame using compression information from the compressed video data.

3. The system of claim 2, wherein the pan detector uses macro block information in the compressed video to detect if the current frame is a pan frame.

4. The system of claim 3, wherein the pan detector detects if the current frame is a pan frame by determining if the macro block information at borders of the current frame is different from the macro block information within the frame, wherein the current frame is a pan frame if the macro block information at borders of the current frame is different from the macro block information within the frame according to a predetermined criteria.

5. The system of claim 4, wherein the pan detector determines the reliable motion vectors by
   (I) selecting all the forward and backward motion vectors that have substantially the same magnitude and direction as the reliable motion vectors if the current frame is a B type frame;
   (II) selecting the motion vector of a macro block as the reliable motion vector if high frequency components of discrete cosine transform are detected in the macro block and if the current frame is a P type frame.

6. The system of claim 2, wherein the pan detector further comprises a state machine that detects whether a pan exists by
- (I) determining that the pan has started if there are a predetermined number of successive pan frames;
- (II) determining that the pan has stopped if there are a predetermined number of successive non-pan frames.

7. The system of claim 2, wherein the pan detector further comprises a key frame selector that selects key frames from a pan based on pan direction and magnitude of the pan.

8. The system of claim 2, wherein the zoom detector uses macro block information in the compressed video to detect if the current frame is a zoom frame.

9. The system of claim 8, wherein the zoom detector detects if the current frame is a zoom frame by determining if the macro block information at borders of the current frame is different from the macro block information within the frame, wherein the current frame is a zoom frame if the macro block information at borders of the current frame is different from the macro block information within the frame.

10. The system of claim 2, wherein the zoom detector further comprises a state machine that detects whether a zoom exists by
- (I) determining that the zoom has started if there are a predetermined number of successive zoom frames;
- (II) determining that the zoom has stopped if there are a predetermined number of successive non-zoom frames.

11. The system of claim 2, wherein the zoom detector farther comprises a key frame selector that selects key frames from a zoom based.

12. The system of claim 1, further comprising a threshold selection unit coupled to the difference detector and the shot boundary detectors to select and adjust the thresholds in accordance with all prior first content differences detected by the difference detector.

13. A system for detecting shot boundary and key frame in a compressed video data, comprising:
- (A) a difference detector that detects content difference between a current frame and a prior frame of a previous group of frames using a first and a second threshold, wherein the difference detector determines the content difference between the current frame and the prior frame by
  - (a1) calculating the histograms of the current and prior frames;
  - (a2) modifying the histograms of the current and prior frames;
  - (a3) offsetting a highest histogram component value in either of the histograms by values of neighboring histogram components;
- (B) a boundary detection and key frame extraction module coupled to the difference detector to detect shot boundaries and extract key frames within the current group of frames using a third threshold in accordance with the content differences detected; and
- (C) a threshold selection unit coupled to the difference detector and the module to generate the thresholds, wherein the threshold selection unit selects and adjusts the thresholds in accordance with the content differences detected by the difference detector.

14. The system of claim 13, wherein the threshold selection unit also adjusts the thresholds to control density of the key frames.

15. The system of claim 13, wherein the threshold selection unit also adjusts the thresholds in accordance with space constraint of a storage buffer that stores all key frames extracted from the compressed video data such that all the key frames can fit into the storage buffer.

16. The system of claim 13, wherein the threshold selection unit further comprises
- (I) a statistics collector that collects all the content differences detected between all current groups of frames and their respective previous groups of frames to obtain mean and standard deviation of the content differences;
- (II) a threshold calculator that computes the thresholds as function of mean and standard deviation and also as function of the space constraint of the storage buffer.

* * * * *